US012274927B2

(12) United States Patent
Milleman et al.

(10) Patent No.: US 12,274,927 B2
(45) Date of Patent: Apr. 15, 2025

(54) ADJUSTABLE LENGTH SHAFT AND AN ADJUSTABLE MASS FOR A GOLF CLUB

(71) Applicant: KARSTEN MANUFACTURING CORPORATION, Phoenix, AZ (US)

(72) Inventors: Travis D. Milleman, Phoenix, AZ (US); Anthony D. Serrano, Phoenix, AZ (US); Eric V. Cole, Phoenix, AZ (US); David S. Kultala, Phoenix, AZ (US); David L. Petersen, Peoria, AZ (US); Les J. Bryant, Peoria, AZ (US); Richard D. MacMillan, Glendale, AZ (US); Rick Solesbee, Phoenix, AZ (US); John A. Solheim, Phoenix, AZ (US); Evan R. Greer, Phoenix, AZ (US)

(73) Assignee: Karsten Manufacturing Corporation, Phoenix, AZ (US)

( * ) Notice: Subject to any disclaimer, the term of this patent is extended or adjusted under 35 U.S.C. 154(b) by 0 days.

(21) Appl. No.: 18/391,404

(22) Filed: Dec. 20, 2023

(65) Prior Publication Data

US 2024/0123307 A1 Apr. 18, 2024

Related U.S. Application Data

(63) Continuation of application No. 17/652,061, filed on Feb. 22, 2022, now Pat. No. 11,850,486, which is a (Continued)

(51) Int. Cl.
*A63B 60/28* (2015.01)
*A63B 53/00* (2015.01)
(Continued)

(52) U.S. Cl.
CPC .............. *A63B 60/28* (2015.10); *A63B 53/08* (2013.01); *A63B 53/007* (2013.01);
(Continued)

(58) Field of Classification Search
CPC ....... A63B 60/28; A63B 53/08; A63B 53/007; A63B 53/0466; A63B 53/047;
(Continued)

(56) References Cited

U.S. PATENT DOCUMENTS 1,665,811 A * 4/1928 Hadden .................. A63B 60/00 473/307
2,044,567 A * 6/1936 Daday .................... A63B 53/06 473/295
(Continued)

FOREIGN PATENT DOCUMENTS

JP S51-33053 3/1976
JP S57-134061 8/1982
(Continued)

OTHER PUBLICATIONS nickleputter.com, http://www.nickelputter.com/en/products/fitting-grip, Publication Date: Accessed Date: Nov. 9, 2012, Accessed Date: Mar. 19, 2015.
(Continued)

*Primary Examiner* — Jeffrey S Vanderveen

(57) ABSTRACT

A golf club has a first shaft coupled to a club head, a second shaft configured to slidably engage a portion of the first shaft, a grip coupled to the second shaft, and an adjustable length shaft assembly received by the second shaft and configured to allow a portion of the first shaft to slide in relation to the second shaft in a first configuration, and to restrict a portion of the first shaft from sliding in relation to the second shaft in a second configuration. The grip is
(Continued)

restricted from rotation about the first shaft or the second shaft as the first shaft slides in relation to the second shaft.

20 Claims, 22 Drawing Sheets

Related U.S. Application Data continuation of application No. 16/539,890, filed on Aug. 13, 2019, now Pat. No. 11,278,780, which is a continuation-in-part of application No. 15/165,889, filed on May 26, 2016, now Pat. No. 10,675,521.

(60) Provisional application No. 62/718,298, filed on Aug. 13, 2018, provisional application No. 62/303,429, filed on Mar. 4, 2016, provisional application No. 62/258,837, filed on Nov. 23, 2015, provisional application No. 62/220,013, filed on Sep. 17, 2015, provisional application No. 62/167,833, filed on May 28, 2015.

(51) Int. Cl.
*A63B 53/04* (2015.01)
*A63B 53/08* (2015.01)
*B25B 23/14* (2006.01)
*B25B 23/142* (2006.01)

(52) U.S. Cl.
CPC ......... *A63B 53/0466* (2013.01); *A63B 53/047* (2013.01); *A63B 2053/0479* (2013.01); *A63B 2225/09* (2013.01); *B25B 23/141* (2013.01); *B25B 23/1427* (2013.01)

(58) Field of Classification Search
CPC ........ A63B 2053/0479; A63B 2225/09; A63B 60/0085; A63B 60/26; A63B 53/14; A63B 60/48; A63B 53/10; A63B 60/04; A63B 60/16; A63B 60/50; A63B 60/52; B25B 23/141; B25B 23/1427
See application file for complete search history.

(56) References Cited

U.S. PATENT DOCUMENTS 2,107,983 A * 2/1938 Thomas ............... A63B 53/007 403/107
2,177,970 A * 10/1939 Wettlaufer ............ A63B 53/12 473/316
2,475,927 A * 7/1949 Verderber ............. A63B 53/14 403/109.3
2,879,065 A * 3/1959 Smith .................... A63B 53/14 473/296
3,524,646 A * 8/1970 Wheeler .............. A63B 53/007 473/296
3,539,185 A * 11/1970 Andis .................... A63B 60/22 248/188.5
4,674,747 A * 6/1987 Mazzocco ............. A63B 60/00 206/315.6
5,496,029 A * 3/1996 Heath .................... A63B 53/10 473/296
5,788,608 A * 8/1998 Wilkinson ........... A63C 11/221 482/74
6,036,607 A * 3/2000 Finegan ................. A63B 60/08 473/206
6,413,168 B1 * 7/2002 McKendry ............ F16M 13/04 396/419
6,547,673 B2 4/2003 Roark
6,780,120 B2 * 8/2004 Murray .................. A63B 53/12 473/294
6,875,123 B2 * 4/2005 Wilson .................. A63B 53/14 473/239
6,935,968 B1 8/2005 Thomas
7,018,302 B2 3/2006 Jacoby
7,074,135 B2 * 7/2006 Moore ................. A63B 53/007 473/296
7,147,568 B1 12/2006 Butler
7,226,365 B2 * 6/2007 Qualizza ................ A63B 53/14 43/18.1 R
7,267,619 B1 * 9/2007 Pettis ..................... A63B 60/24 473/297
7,422,526 B2 * 9/2008 Nemeckay ............ A63B 60/00 403/370
7,563,173 B2 7/2009 Chol
7,704,159 B1 * 4/2010 McDonald ............ A63B 53/02 473/296
7,704,161 B2 * 4/2010 Lindner ................. A63B 60/24 473/297
7,874,933 B2 1/2011 Chol
7,976,402 B2 7/2011 Chol
8,100,780 B1 * 1/2012 Chol .................... A63B 53/007 403/377
8,147,348 B2 * 4/2012 Chol .................... A63B 53/007 473/239
8,313,392 B2 11/2012 White
8,328,657 B1 * 12/2012 Demkowski ......... A63B 53/007 473/239
8,425,344 B2 4/2013 Evans
8,425,345 B2 4/2013 Wall, Jr.
8,454,451 B2 6/2013 Evans
8,491,408 B2 7/2013 Beach
8,495,915 B2 7/2013 Yamano
8,496,539 B2 * 7/2013 Solheim ............... A63B 53/007 473/296
8,529,367 B2 9/2013 Evans
8,641,551 B2 * 2/2014 Johnson ................. A63B 60/24 473/297
8,678,944 B2 * 3/2014 Wall, Jr. ................. A63B 53/12 403/109.3
8,747,247 B2 6/2014 Beach
8,758,155 B1 * 6/2014 Demkowski ........... A63B 60/00 473/296
8,814,718 B1 * 8/2014 Rollinson ............. A63B 60/28 473/299
8,834,288 B2 * 9/2014 Aguinaldo ............ A63B 60/28 403/109.1
9,050,511 B2 6/2015 Hicks
9,089,750 B2 7/2015 Knutson
9,242,154 B2 1/2016 Knutson
9,333,400 B2 5/2016 Girard
10,220,276 B2 3/2019 Knutson
10,675,521 B2 6/2020 Milleman
2001/0011042 A1 * 8/2001 Roark .................... A63B 60/28 473/288
2002/0091012 A1 * 7/2002 Evans .................... A63B 60/22 473/316
2003/0083144 A1 * 5/2003 Shin ..................... A63B 53/007 473/307
2003/0207723 A1 * 11/2003 Jacoby ................ A63B 53/007 473/298
2005/0143186 A1 * 6/2005 Blattner ................. A63B 53/14 473/306
2008/0004128 A1 * 1/2008 Chol ...................... A63B 53/14 473/316
2010/0056291 A1 * 3/2010 Chol ...................... A63B 53/12 473/296
2010/0216568 A1 * 8/2010 Chol ...................... A63B 53/10 473/313
2010/0304881 A1 * 12/2010 Chol .................... A63B 53/007 473/296
2011/0077096 A1 * 3/2011 White .................... A63B 53/08 473/297
2011/0081984 A1 * 4/2011 Beach .................... A63B 53/14 473/296
2011/0230277 A1 * 9/2011 Chol ...................... A63B 60/00 473/296
2012/0149485 A1 * 6/2012 Evans .................... A63B 53/14 473/316

(56) References Cited

U.S. PATENT DOCUMENTS

| | | | | |
|---|---|---|---|---|
| 2012/0149486 | A1* | 6/2012 | Wall, Jr. | A63B 53/10 473/296 |
| 2012/0149487 | A1* | 6/2012 | Evans | A63B 53/10 473/316 |
| 2012/0149489 | A1* | 6/2012 | Wall, Jr. | A63B 53/12 473/316 |
| 2012/0184389 | A1* | 7/2012 | Evans | A63B 60/50 473/297 |
| 2012/0258817 | A1* | 10/2012 | Beach | A63B 53/10 473/296 |
| 2013/0109488 | A1* | 5/2013 | Evans | A63B 60/28 473/409 |
| 2013/0109491 | A1* | 5/2013 | Solheim | A63B 53/14 473/316 |
| 2013/0109493 | A1* | 5/2013 | Hicks | F16F 7/00 267/141 |
| 2013/0281224 | A1* | 10/2013 | Zabala Scharpp | A63B 60/00 29/428 |
| 2014/0073448 | A1* | 3/2014 | Knutson | A63B 53/10 473/296 |
| 2014/0121031 | A1* | 5/2014 | Aguinaldo | A63B 59/60 473/239 |
| 2014/0206469 | A1* | 7/2014 | Girard | A63B 53/02 473/287 |
| 2014/0342845 | A1* | 11/2014 | Dingman | A63B 60/16 473/297 |
| 2015/0126298 | A1* | 5/2015 | Knutson | A63B 53/14 473/296 |
| 2017/0021250 | A1* | 1/2017 | Milleman | A63B 53/10 |
| 2018/0036613 | A1* | 2/2018 | Knutson | A63B 60/42 |
| 2022/0111274 | A1 | 4/2022 | Milleman | |

FOREIGN PATENT DOCUMENTS

| | | |
|---|---|---|
| JP | H5-95562 | 12/1993 |
| JP | H9-201435 | 8/1997 |

OTHER PUBLICATIONS

Kozuchowski, http://www.golfwrx.com/275127//, Publicaion Date: Jan. 19, 2015, Accessed Date: Mar. 19, 2015.

Kozuchowski, http://www.golfwrx.com/204723/, Review: Odyssey Tank Cruiser Putters, Publication Date: Apr. 4, 2014, Accessed Date: Mar. 19, 2015.

International Search Report and Written Opinion dated Dec. 1, 2016 for PCT Application No. PCT/US16/34405, filed May 26, 2016.

International Search Report and Written Opinion dated Oct. 28, 2019 for PCT Application No. PCT/US2019/046407, filed Aug. 13, 2019.

* cited by examiner

ADJUSTABLE LENGTH SHAFT AND AN ADJUSTABLE MASS FOR A GOLF CLUB

CROSS-REFERENCE TO RELATED APPLICATIONS

This is a continuation of U.S. patent application Ser. No. 17/652,061 filed Feb. 22, 2022, which is a continuation of U.S. Nonprovisional patent application Ser. No. 16/539,890, filed on Aug. 13, 2019, now U.S. Pat. No. 11,278,780 issued Mar. 22, 2022, which claims the benefit of U.S. Provisional Patent Application No. 62/718,298, filed on Aug. 13, 2018, and is a continuation-in-part of U.S. Nonprovisional patent application Ser. No. 15/165,889, filed on May 26, 2016, and is issued as U.S. Pat. No. 10,675,521 on Jun. 9, 2020, which claims the benefit of U.S. Provisional Patent Application No. 62/167,833, filed on May 28, 2015, U.S. Provisional Patent Application No. 62/220,013, filed on Sep. 17, 2015, U.S. Provisional Patent Application No. 62/258,837, filed on Nov. 23, 2015, and U.S. Provisional Patent Application No. 62/303,429, filed on Mar. 4, 2016. The contents of all disclosures above are incorporated fully herein by reference.

FIELD OF THE INVENTION

The present disclosure relates to a golf club, and more specifically to a golf club having an adjustable length shaft that allows for selective lengthening or shortening of the club. In addition, the disclosure relates to an adjustable mass within a golf club shaft that allows for selective adjustment of club swing weight and moment of inertia while maintaining the overall weight of the club.

BACKGROUND

Golf clubs take various forms, for example a wood, a hybrid, an iron, a wedge, or a putter, and these clubs generally differ in head shape and design (e.g., the difference between a wood and an iron), club head material(s), shaft material(s), club length, and club loft.

Generally, when assembling a known golf club, the shaft is cut or trimmed to a desired length. Woods and hybrids generally have a longer shaft than irons, wedges, and putters, with putters generally having the shortest shaft length. After the shaft is trimmed to the desired length, the shaft is attached to the golf club head by a hosel. The shaft is typically attached to the golf club head with an epoxy or other adhesive. In some golf clubs, however, the shaft is coupled to an adapter that engages a removable threaded member in the hosel, securing the shaft to the golf club head. A grip is then installed on the shaft.

After assembly of these known golf clubs it is difficult to adjust the length of the shaft. A first option is to remove and replace the original shaft with a new shaft of a different length. Unfortunately, this option results in additional cost for the new shaft. A second option is to remove the grip, either cut off a portion of the butt end of the shaft (e.g., the end of the shaft opposite the golf club head) to shorten the shaft or install a shaft extension in the butt end of the shaft to lengthen the shaft, and then install a new grip. This option not only incurs additional expense associated with a new grip, but adjusting the shaft length at the butt end modifies the swing weight of the golf club (specifically, shortening drops swing weight while lengthening increases swing weight), modifies the total weight of the golf club (shortening drops total weight while lengthening increases total weight), and modifies the shaft stiffness (shortening generally increases shaft stiffness while lengthening generally decreases shaft stiffness). Both options are undesirable for the casual golfer due to the added expense, time incurred repairing or adjusting the golf club, and/or adverse changes to golf club total weight, golf club swing weight, and/or stiffness of the shaft.

While there are known options for adjusting the length of a golf club shaft, there is a need to improve adjustability of shaft length without substantially impacting the total weight, swing weight, or aesthetics of the golf club.

DETAILED DESCRIPTION

Figure 1:
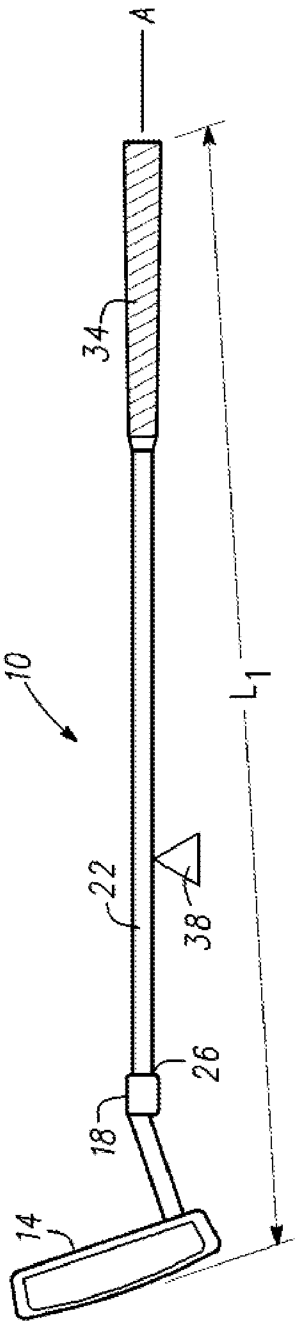
FIG. 1 is an elevation view of an embodiment of a golf club having an adjustable length shaft assembly in a first shaft length configuration.

The present embodiments discussed below are directed to a golf club having a first shaft coupled to a club head, a second shaft configured to slidably engage a portion of the first shaft, a grip coupled to the second shaft, and an adjustable length shaft assembly received by the second shaft and configured to allow a portion of the first shaft to slide in relation to the second shaft. The adjustable length shaft assembly further includes an insert coupled to an axial end face of the first shaft that has a threaded engagement with a threaded screw. The threaded screw is configured to rotate, and the insert and first shaft are configured to translate together along the threaded screw to adjust the length of the golf club. The insert further comprises nodal protrusions positioned on an outer surface of the insert and ribs positioned on an inner surface of the insert to minimize side to side or radial movement between the first shaft and the second shaft during operation of the adjustable length shaft assembly.

In one embodiment, a golf club has a first shaft coupled to a club head, a second shaft configured to slidably engage a portion of the first shaft, a grip coupled to the second shaft, and an adjustable length shaft assembly received by the second shaft and configured to allow a portion of the first shaft to slide in relation to the second shaft in a first configuration, and to restrict a portion of the first shaft from sliding in relation to the second shaft in a second configuration. The grip is restricted from rotation about the first shaft or the second shaft as the first shaft slides in relation to the second shaft.

In another embodiment, a golf club has a shaft coupled to a club head, a grip coupled to the first shaft, and an adjustable mass assembly received by the shaft and having a mass configured to move within the shaft between the club head and the grip.

A method of manufacturing an adjustable length golf club includes coupling a first shaft to a club head, coupling a retainer to the first shaft, coupling an adjustable length shaft assembly to a second shaft, and coupling the first shaft to the second shaft, wherein the retainer engages a portion of the adjustable length shaft assembly.

Other features and aspects will become apparent by consideration of the following detailed description and accompanying drawings. Before any embodiments of the disclosure are explained in detail, it should be understood that the disclosure is not limited in its application to the details or construction and the arrangement of components as set forth in the following description or as illustrated in the drawings. The disclosure is capable of supporting other embodiments and of being practiced or of being carried out in various ways. It should be understood that the description of specific embodiments is not intended to limit the disclosure from covering all modifications, equivalents and alternatives falling within the spirit and scope of the disclosure. Also, it is to be understood that the phraseology and terminology used herein is for the purpose of description and should not be regarded as limiting.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but can include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

The terms "couple," "coupled," "couples," "coupling," and the like should be broadly understood and refer to connecting two or more elements, mechanically or otherwise. Coupling (whether mechanical or otherwise) can be for any length of time, e.g., permanent or semi-permanent or only for an instant.

For ease of discussion and understanding, and for purposes of description only, the following detailed description illustrates a golf club 10 as a putter. It should be appreciated that the putter is provided for purposes of illustration of the adjustable length shaft assembly that increases or decreases the shaft length of the golf club, and of the adjustable mass assembly that adjusts the swing weight and moment of inertia while maintaining the total weight of the golf club. The disclosed adjustable length shaft assembly and/or adjustable mass assembly can be used in association with any desired driver, fairway wood, wood generally, hybrid, iron, wedge, putter, or other golf club.

Figure 2:
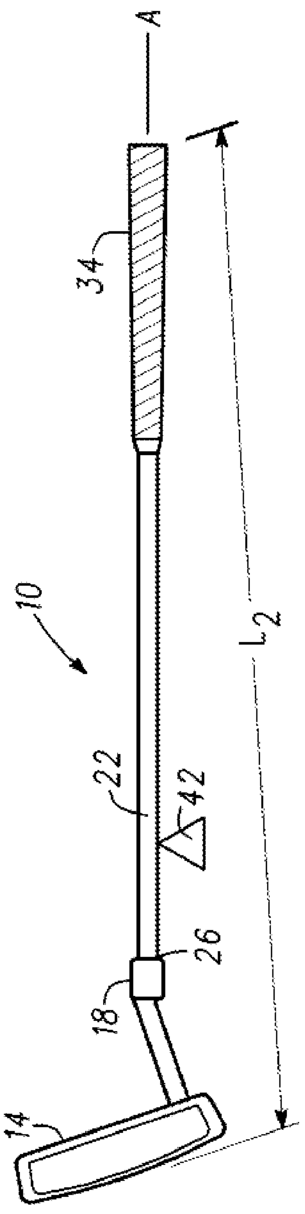
FIG. 2 is an elevation view of the golf club of FIG. 1 with the adjustable length shaft assembly in a second shaft length configuration that is shorter in length than the first shaft length configuration.

Referring now to the figures, FIGS. 1-2 illustrate an embodiment of the golf club 10 that incorporates the adjustable length shaft assembly. The golf club 10 includes a club head 14 with a hosel 18. A first shaft 22 is attached at a first end or tip 26 to the hosel 18, while a second end or butt 30 (shown in FIG. 6) of the shaft 22 is received by a grip 34. The shaft 22 extends along an axis A. In FIG. 1, the shaft 22 is illustrated in a first shaft length configuration having a first club length $L_1$, the shaft 22 having a first balance point 38. In FIG. 2, the shaft 22 is illustrated in a second shaft length configuration having a second club length $L_2$, the shaft 22 having a second balance point 42. The second club length $L_2$ is less than the first club length $L_1$. Due to the shorter club length $L_2$, the second balance point 42 of the shaft 22 is closer to the club head 14 than the first balance point 38 of the shaft 22 associated with the longer club length $L_1$. The adjustable length shaft assembly is contained within the shaft 22 and the grip 34 and generally not visible from the exterior of the golf club 10.

In various embodiments, the club length of the golf club 10 can be any suitable or desired club length. For example, the club length can be greater than or equal to 30, 31, 32, 33, 34, 35, 36, 37, 38, 39, 40, 41, 42, 43, 44, 45, 46, 47, 48, 49, or 50 inches. The adjustable length shaft assembly as disclosed herein can adjust the club length between a range of any suitable or desired club lengths. For example, the adjustable length shaft assembly can adjust the club length by approximately 0-15 inches, 0-14 inches, 0-13 inches, 0-12 inches, 0-11 inches, 0-10 inches, 0-9 inches, 0-8 inches, 0-7 inches, 0-6 inches, 0-5 inches, 0-4 inches, 0-3 inches, 0-2 inches, 0-1 inches, or any other suitable range of adjustment in club length.

As a non-limiting example for a putter, the adjustable length shaft assembly can adjust the club length from the first club length $L_1$ of approximately 36 inches to the second club length $L_2$ of approximately 30 inches. It should be appreciated that the first club length $L_1$ and the second club length $L_2$ can be any suitable or desired respective club length, including the example club lengths disclosed herein.

In this example, the club length is adjustable between 0-6 inches. In other examples, the adjustable length shaft assembly can adjust the club length by approximately 0-15 inches, 0-14 inches, 0-13 inches, 0-12 inches, 0-11 inches, 0-10 inches, 0-9 inches, 0-8 inches, 0-7 inches, 0-5 inches, 0-4 inches, 0-3 inches, 0-2 inches, 0-1 inches, or any other suitable range of adjustment in club length.

As a non-limiting example for a driver, the adjustable length shaft assembly can adjust the club length from the first club length $L_1$ of approximately 48 inches to the second club length $L_2$ of approximately 44 inches. It should be appreciated that the first club length $L_1$ and the second club length $L_2$ can be any suitable or desired respective club length, including any of the example club lengths disclosed herein. In this example, the club length is adjustable between 0-4 inches. In other examples, the adjustable length shaft assembly can adjust the club length by approximately 0-15 inches, 0-14 inches, 0-13 inches, 0-12 inches, 0-11 inches, 0-10 inches, 0-9 inches, 0-8 inches, 0-7 inches, 0-6 inches, 0-5 inches, 0-3 inches, 0-2 inches, 0-1 inches, or any other suitable range of adjustment in club length.

As a non-limiting example for a fairway wood, the adjustable length shaft assembly can adjust the club length from the first club length $L_1$ of approximately 44 inches to the second club length $L_2$ of approximately 38 inches. It should be appreciated that the first club length $L_1$ and the second club length $L_2$ can be any suitable or desired respective club length, including any of the example club lengths disclosed herein. In this example, the club length is adjustable between 0-6 inches. In other examples, the adjustable length shaft assembly can adjust the club length by approximately 0-15 inches, 0-14 inches, 0-13 inches, 0-12 inches, 0-11 inches, 0-10 inches, 0-9 inches, 0-8 inches, 0-7 inches, 0-5 inches, 0-4 inches, 0-3 inches, 0-2 inches, 0-1 inches, or any other suitable range of adjustment in club length.

As a non-limiting example for a hybrid, the adjustable length shaft assembly can adjust the club length from the first club length $L_1$ of approximately 42 inches to the second club length $L_2$ of approximately 35 inches. It should be appreciated that the first club length $L_1$ and the second club length $L_2$ can be any suitable or desired respective club length, including any of the example club lengths disclosed herein. In this example, the club length is adjustable between 0-7 inches. In other examples, the adjustable length shaft assembly can adjust the club length by approximately 0-15 inches, 0-14 inches, 0-13 inches, 0-12 inches, 0-11 inches, 0-10 inches, 0-9 inches, 0-8 inches, 0-6 inches, 0-5 inches, 0-4 inches, 0-3 inches, 0-2 inches, 0-1 inches, or any other suitable range of adjustment in club length.

As a non-limiting example for one or more irons or wedges, the adjustable length shaft assembly can adjust the club length from the first club length $L_1$ of approximately 42 inches to the second club length $L_2$ of approximately 35 inches. It should be appreciated that the first club length $L_1$ and the second club length $L_2$ can be any suitable or desired respective club length, including any of the example club lengths disclosed herein.

It should be appreciated that adjustment of the club length with the adjustable length shaft assembly as described herein is not discrete. Rather, the adjustable length shaft assembly described herein allows for adjustment of the club length to any length or position between the first club length $L_1$ and the second club length $L_2$.

Figure 3:
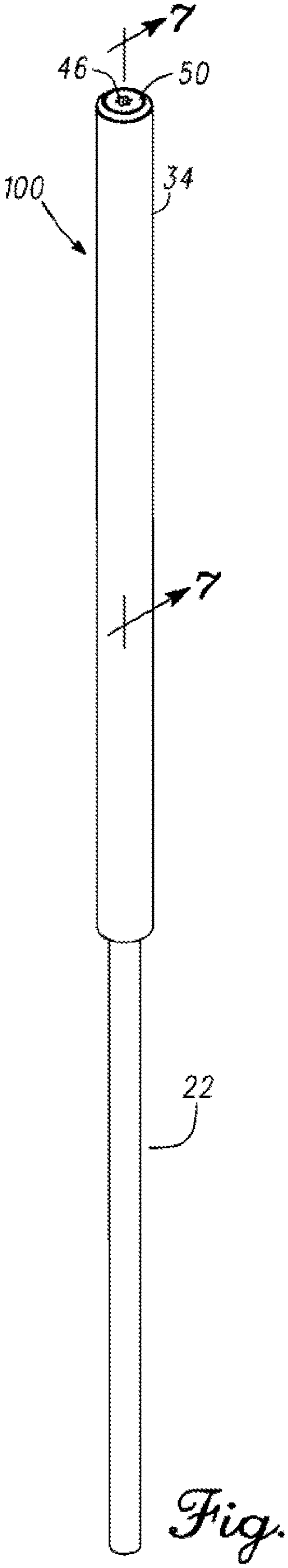
FIG. 3 is a perspective view of a first embodiment of the adjustable length shaft assembly for use with the golf club of FIG. 1.

FIGS. 3-7 illustrate a first embodiment of the adjustable length shaft assembly 100. The first embodiment of the assembly 100 generally employs a threaded screw 140, which is disclosed in additional detail below, to selectively adjust and maintain the length of the golf club 10. Referring to FIG. 3, the grip 34 defines an aperture 46 at an end face 50. The aperture 46 provides access to a rotating screw head 104 having a polygonal socket 108, shown in FIGS. 4-5. The aperture 46 in grip 34 can be a vent hole in the grip 34. However, in other embodiments, the aperture 46 can be a specially designed or custom hole through the grip to provide adequate access to the socket 108. As a non-limiting example, the aperture 46 can be a hole that is larger than a typical vent hole, and of sufficient size to receive a portion of a torque wrench to facilitate engagement of the torque wrench with the socket 108. While the socket 108 is illustrated as a star shaped socket, in other embodiments the socket 108 can be any suitable shape, such as a triangle, square, slot, Phillips®, Torx®, POSIDRIV®, SUPA-DRIVE®, pentagon, hexagon, or any other suitable polygon or other shape keyed to a corresponding torque wrench or adjustment tool.

Figure 4:
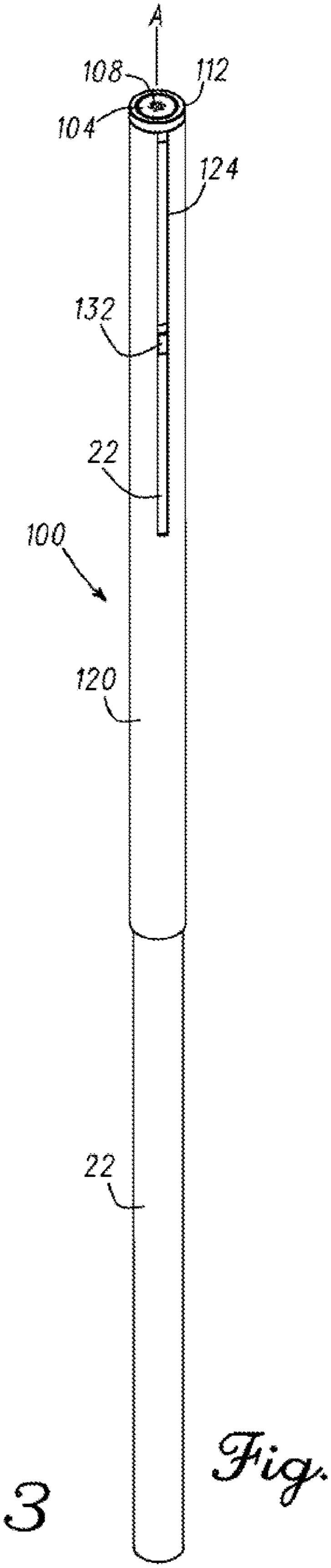
FIG. 4 is a perspective view of the first embodiment of the adjustable length shaft assembly of FIG. 3 with the grip removed.
Figure 5:
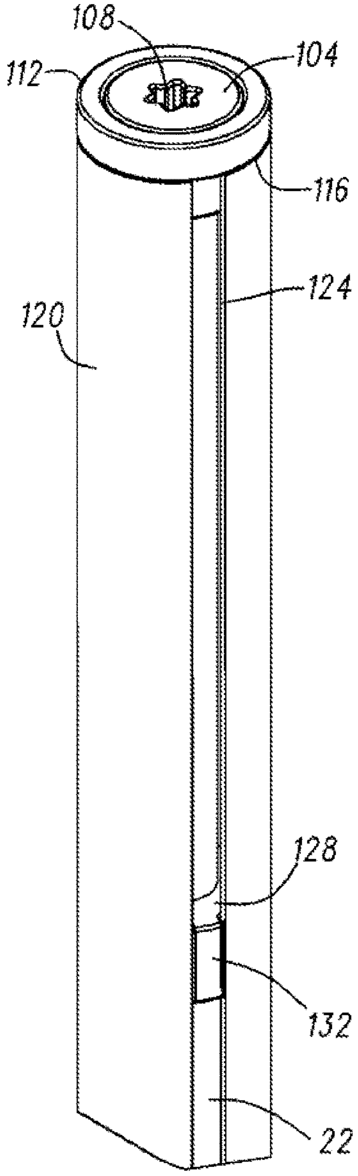
FIG. 5 is a perspective view of a portion of the adjustable length shaft assembly of FIG. 3 with the grip removed, as detailed in box 5-5 of FIG. 4.

Referring to FIGS. 4-5, the screw head 104 is received by a retainer 112 that is static with respect to a second shaft 120, but allows for rotation of the screw head 104. The retainer 112 is itself received by a second end or butt end 116 of the second shaft 120. The second shaft 120 includes a slot or cutout 124 that extends along an axis A (shown in FIG. 4) in a direction from the second end 116 towards the club head 14. In the illustrated embodiment the slot 124 is approximately five inches long. However, in other embodiments, the slot 124 can have a length that ranges from approximately one inch to approximately nine inches, and more specifically from approximately two inches to approximately eight inches, and more specifically from approximately three inches to approximately seven inches, and more specifically from approximately four inches to approximately six inches, or any suitable or desired length which can correspond to length of adjustability of the golf club 10. In addition, while the slot 124 is illustrated as an open slot (i.e., extends through the second shaft 120), in other embodiments the slot 124 can be a closed slot, for example, but not limited to, a channel or guide channel. Further, while the slot 124 is illustrated as extending through the second shaft 120 at the second end 116, in other embodiments the slot 124 does not need to extend through the second end 116 and can be positioned or otherwise provided at any location along the second shaft 120.

Figure 6:
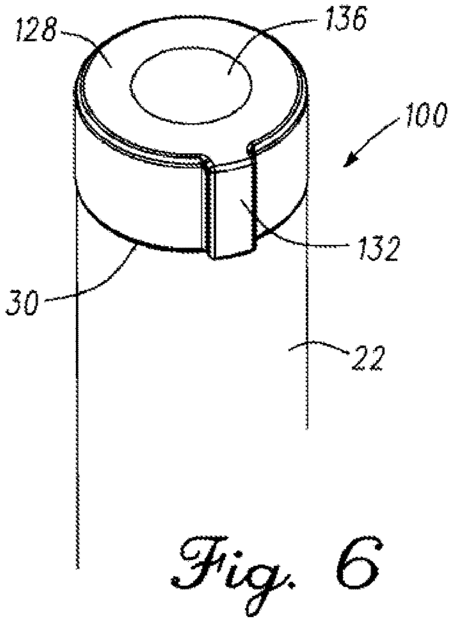
FIG. 6 is a perspective view of a portion of the adjustable length shaft assembly of FIG. 3, with the grip and an outer shaft removed to illustrate an inner shaft carrying an insert.

FIGS. 5-6 depict an insert 128 that is received in the second end 30 of the first shaft 22. The insert 128 has a protrusion 132 that extends beyond an outer circumference of the first shaft 22. The protrusion 132 is keyed to be received by the slot 124. The insert 128 also defines a threaded aperture 136.

Figure 7:
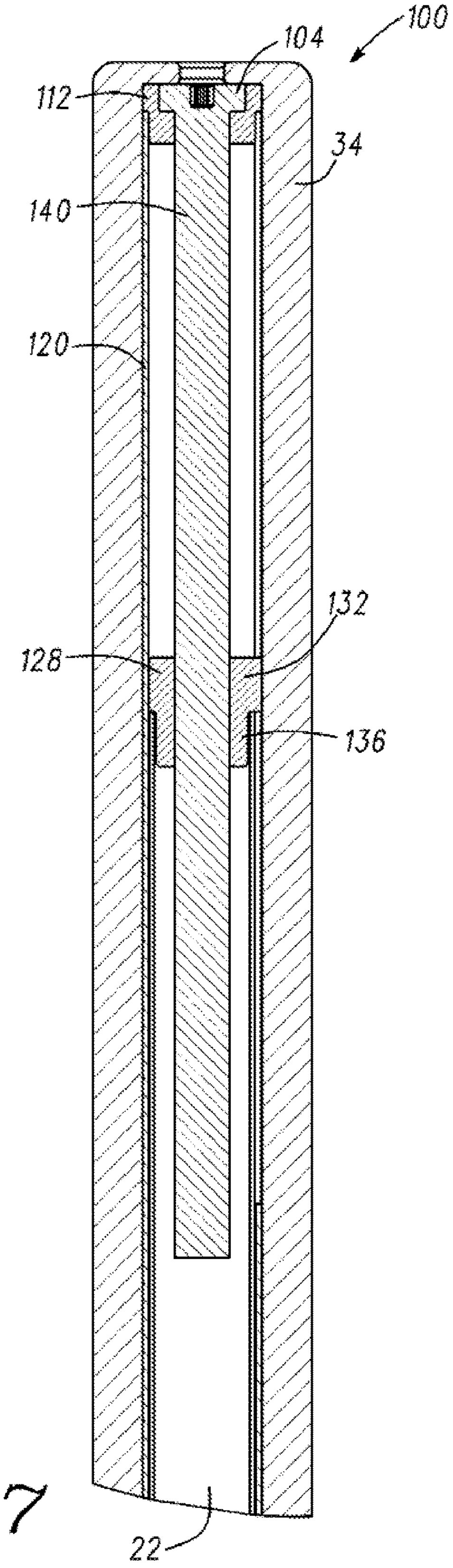
FIG. 7 is a cross section view of a portion of the adjustable length shaft assembly of FIG. 3, taken along line 7-7 of FIG. 3.

Referring to FIG. 7, the threaded aperture 136 receives a corresponding threaded screw 140 that extends away from the screw head 104. In addition, the grip 34 is attached to the second shaft 120, and is not attached to the first shaft 22. A portion of the first shaft 22 is received by the second shaft 120 to allow the first and second shafts 22, 120 to axially move in relation to one another.

As illustrated in FIG. 7, the second shaft 120 is made of graphite, while the insert 128 is made of aluminum. These materials are light in weight to minimize the effect the adjustable length shaft assembly 100 has on swing weight and total weight of the golf club 10. In other embodiments, the retainer 112, second shaft 120, and insert 128 can be made of any suitable or desired material, including, but not limited to aluminum, steel, titanium, graphite, other metals, composites, metal alloys, polymer, polyurethane, thermoplastic polyurethane, thermoplastic elastomer, reinforced polyurethane, polyethylene, polypropylene, polytetrafluroethylene, polyisobutylene, polyvinycloride, polyamide, nylon 66, or any other material. Further, the retainer 112, the second shaft 120, and insert 128 can be made of the same material, or the retainer 112, the second shaft 120, and insert 128 can be made of different materials. In one example, the second shaft 120 and the insert 128 can be made of nylon 66.

In other embodiments, the retainer 112, the second shaft 120, or the insert 128 can be made of a material described above and further include a filler. The filler can be glass, carbon fiber, metal, or any other suitable filler. The material of the retainer 112, the second shaft 120, or the insert 128 can comprise a filler percentage by volume. In some embodiments, the material of the retainer 112, the second shaft 120, or the insert 128 can comprise 0-90% filler by volume. In some embodiments, the material of the retainer 112, the second shaft 120, or the insert 128 can comprise 0-50%, or 50-90% filler by volume. In some embodiments, the material of the retainer 112, the second shaft 120, or the insert 128 can comprise 0-40%, 10-50%, 20-60%, 30-70%, 40-80%, 50-90%, or 60-100% filler by volume. For example, the material of the retainer 112, the second shaft 120, or the insert 128 can comprise 0%, 10%, 20%, 30%, 40%, 45%, 50%, 55%, 60%, 65%, 70%, 75%, 80%, or 90% filler by volume. For further example, the insert 128 can be made of nylon 66 with 30% carbon fiber filler by volume. For further example, the insert 128 can be made of nylon 66 with 50% glass filler by volume. For further example, the retainer 112 can be made of nylon 66 with 50% glass filler by volume. For further example, the second shaft 120 can be made of nylon 66 with 30% carbon fiber filler by volume.

In operation of the adjustable length shaft assembly 100, a user inserts a portion of a torque wrench into the aperture 46 defined by the grip 34 to engage the torque wrench with the socket 108 of the screw head 104. To increase the club length of the golf club 10, the user rotates the torque wrench in a first direction, rotating the screw head 104 and associated screw 140 within the retainer 112. The threads of screw 140 cooperate with the threads of the aperture 136 in the insert 128. The protrusion 132 fixes the rotational position of the insert 128 relative to the second shaft 120, such that the rotation of the screw 140 drives the insert 128 axially along the slot 124. As the screw 140 rotates in the first direction, the protrusion 132 translates within the slot 124, moving the insert 128 away from the second end 116 and the first shaft 22 away from the second shaft 120. The insert 128 and the first shaft 22 move together and away from the second end 116 as the screw 140 rotates in the first direction. The insert 128 is positioned away from the second end 116 in an extended or expanded configuration. The protrusion 132 in the slot 124 also restricts rotation of the second shaft 120 in relation to the first shaft 22, maintaining the orientation of the grip 34 in relation to the club head 14 (or stated another way, the protrusion 132 restricts rotation of the grip 34 about the first shaft 22). This is advantageous for certain clubs, for example, a putter having a paddle grip 34 (i.e., a flat surface on the grip 34), as the paddle maintains its orientation with the club head 14 as the club length increases (or decreases). Once the desired club length is attained, the user removes the torque wrench from the screw head 104, temporarily locking the adjustable length shaft assembly at the desired club length.

Similarly, to decrease the club length of the golf club 10, the user engages the torque wrench with the socket 108 of the screw head 104 and rotates the torque wrench in a second direction, opposite the first direction. As the screw 140 rotates in the second direction, the insert 128 moves towards the second end 116 and the first shaft 22 moves towards the second shaft 120. The insert 128 and the first shaft 22 move together towards the second end 116 as the screw 140 rotates in the second direction. The insert 128 can abut or be adjacent to the retainer 112 in a fully contracted configuration. The protrusion 132 in the slot 124 again restricts rotation of the second shaft 120 in relation to the first shaft 22, maintaining the orientation of the grip 34 in relation to the club head 14 (or restricts rotation of the grip 34 about the first shaft 22). Once the desired club length is attained, the user removes torque wrench from the screw head 104, temporarily locking the adjustable length shaft assembly at the desired club length.

The threaded screw 140 can be a single start screw having a single thread, or the threaded screw 140 can be a multi-start screw having more than one thread. The threads of the threaded screw 140 can be continuous along the length of the threaded screw 140. In other embodiments, the threads of the threaded screw 140 can be discontinuous along the length of the threaded screw 140. For example, the threaded screw 140 can have one, two, three, four, five, or any other number of threads. In embodiments where the threaded screw 140 is a multi-start screw, length adjustments can be made with fewer rotations of the torque wrench than with the single start threaded screw. Accordingly, a multi-start threaded screw can allow for faster length adjustment of the golf club 10 having the adjustable length shaft assembly 100. The threaded screw 140 can have at least one channel running along the length of the threaded screw 140 to ease in the molding process (not shown). The channels running along the length of the threaded screw 140 can break up the threads into one or more threaded regions. The one or more threaded regions can be interspersed with non-threaded regions along the length of the threaded screw 140 (not shown). Stated another way, the one or more threaded regions can be separated by non-threaded regions along the length of the threaded screw 140 (not shown). In one embodiment, the threaded screw 140 can have at least one channel, two channels, three channels, or four channels running along the length of the threaded screw. In another embodiment, the threaded screw 140 can have two channels cut into the thread on either side of the threaded screw 140 to ease in the molding process. The channels can run for part or all the length of the threaded screw 140 (not shown).

Figure 8:
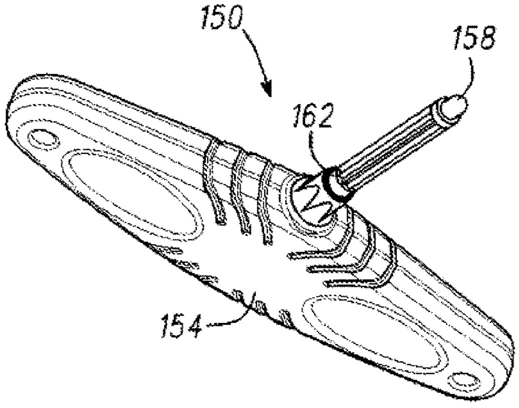
FIG. 8 is a perspective view of an embodiment of a torque limiting tool for use with the adjustable length shaft assembly of FIG. 3.

To prevent the user from applying excessive torque on the screw head 104 as the user increases or decreases the length of the golf club 10, the torque wrench can be a torque limiting tool 150. FIG. 8 illustrates an example of an embodiment of the torque limiting tool 150. The tool 150 includes a handle 154 attached to a tip 158 by a torque limiting joint 162. When a user applies a torque to the handle 154 greater than a predetermined torque, the joint 162 can slip or ratchet to prevent the transfer of excessive torque to the tip 158 and prevent potential damage to components of the adjustable length shaft assembly 100.

In the illustrated embodiment, the second shaft includes the slot and the insert includes the protrusion. In other embodiments, the second shaft can include more than one slot and the insert can include more than one protrusion. The second shaft can have any number of slots, such as one, two, three, four, five, or any other number of slots. The insert can have any number of protrusions corresponding to the number of slots, such as one, two, three, four, five, or any other number of protrusions. For example, the second shaft can include three slots that correspond to three protrusions on the insert, or the second shaft can include four slots that correspond to four protrusions on the insert. In some embodiments, the slots can be positioned equidistant or asymmetric around the second shaft. Further, the protrusions can be positioned equidistance or asymmetric around the insert.

In other embodiments still, the second shaft can include the one or more protrusions, and the insert can include the one or more slots. In these or other embodiments, the second shaft can have any number of protrusions, such as one, two, three, four, five, or any other number of protrusions. In these or other embodiments, the insert can have any number of slots corresponding to the number of protrusions, such as one, two, three, four, five, or any other number of slots. For example, the second shaft can include three protrusions that correspond to three slots on the insert, or the second shaft can include four protrusions that correspond to four slots on the insert. In some embodiments, the protrusions can be positioned equidistant or asymmetric around the second shaft. Further, the slots can be positioned equidistance or asymmetric around the insert.

FIGS. 9-13 illustrate a second embodiment of the adjustable length shaft assembly 200. The assembly 200 has common elements with the assembly 100, with the common elements being given the same reference numerals. The second embodiment of the assembly 200 includes a compression assembly 204 that generally employs an elastic compression member, which is disclosed in additional detail below, to selectively adjust and maintain the length of the golf club 10.

Figure 9:
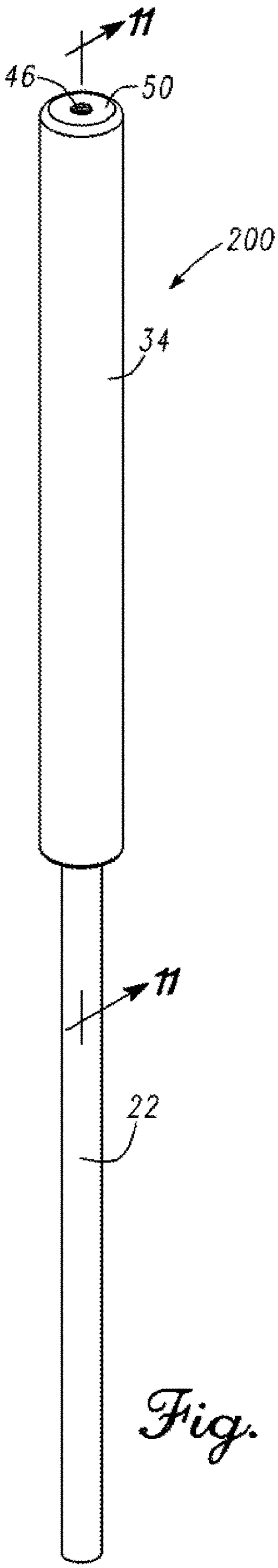
FIG. 9 is a perspective view of a second embodiment of the adjustable length shaft assembly for use with the golf club of FIG. 1.

Referring to FIG. 9, the grip 34 defines the aperture 46 at the second end 50. The aperture 46 provides access to a portion of the compression assembly 204 (shown in FIGS. 11-12), and more specifically access to a portion of an adjustment member 208 (shown in FIGS. 11-12) that carries the socket 108 (shown in FIG. 12). The grip 34 is attached to the second shaft 120 (shown in FIG. 10), while not being attached to the first shaft 22.

Figure 10:
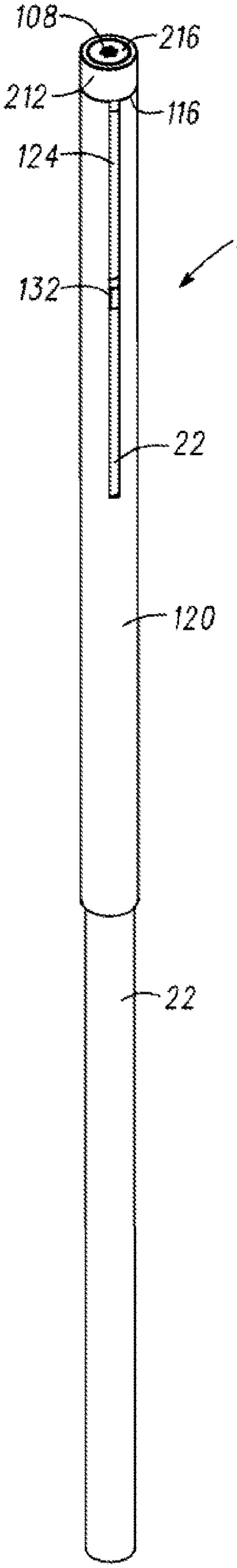
FIG. 10 is a perspective view of the second embodiment of the adjustable length shaft assembly of FIG. 9 with the grip removed.
Figure 11:
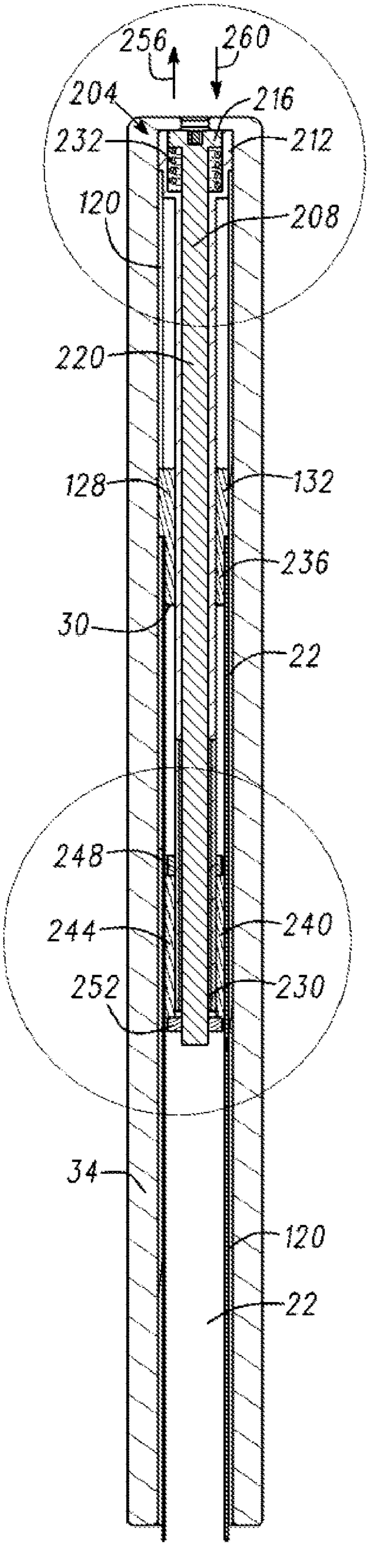
FIG. 11 is a cross section view of a portion of the adjustable length shaft assembly of FIG. 9, taken along line 11-11 of FIG. 9.

As depicted in FIGS. 10-11, a portion of the first shaft 22 is received by the second shaft 120 to allow the first and second shafts 22, 120 to axially move in relation to one another. The insert 128 is secured to the second end 30 of the first shaft 22 (shown in FIG. 11). The insert 128 also includes the protrusion 132 that extends beyond an outer circumference of the first shaft 22. The second shaft 120 includes the slot 124, which extends axially along the second shaft 120 in a direction from the second end 116 towards the club head 14. The protrusion 132 is keyed to be received by the slot 124.

Figure 12:
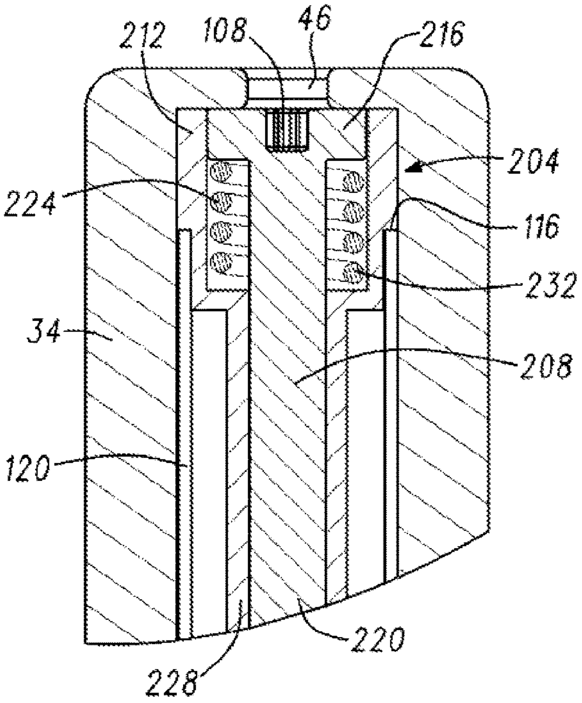
FIG. 12 is a partial cross section view of a portion of the adjustable length shaft assembly of FIG. 9, as detailed in box 12-12 of FIG. 11, and with the grip removed.

Referring now to FIGS. 11-12, the compression assembly 204 includes the adjustment member 208 and a retainer 212. The adjustment member 208 includes a head or head portion 216 connected to a member or shaft portion 220. The member 220 extends away from the head 216 into the second shaft 120. In the illustrated embodiment, the head 216 has a diameter generally greater than the diameter of the member 220. However, in other embodiments, the head 216 can have a diameter approximately the same size or generally less than the diameter of the member 220.

The retainer 212 includes a well 224 defining a recess connected to a tubular portion 228. The tubular portion 228 extends away from the well 224 and into the second shaft 120. The tubular portion 228 also defines an opening or open end 230 (shown in FIGS. 11 and 13) at an end of the tubular portion 228 opposite the well 224. The retainer 212 is received by the second shaft 120 through the second end 116. In addition, the retainer 212, and more specifically the well 224, is attached to the second shaft 120 at the second end 116. The retainer 212 does not rotate or otherwise move independently of the second shaft 120. Instead, the retainer 212 travels with the second shaft 120. In the illustrated embodiment, the well 224 has a diameter generally greater than the diameter of the tubular portion 228. However, in other embodiments, the well 224 can have a diameter approximately the same size or generally less than the diameter of the tubular portion 228.

The retainer 212 slidably receives the adjustment member 208, such that the adjustment member 208 slides within the retainer 212. The well 224 slidably receives the head 216, while the tubular portion 228 slidably receives a portion of the member 220, with the member 220 extending through the tubular portion 228 and out the open end 230. To facilitate slidable movement of the adjustment member 208 within the retainer 212, the tubular portion 228 has an inner diameter that is complementary to an outer diameter of the member 220. Similarly, the well 224 has an inner diameter that is complementary to an outer diameter of the head 216. The complementary sizes allows the adjustment member 208 to slide in an axial direction, or a direction approximately parallel to the first and second shafts 22, 120, with respect to the retainer 212.

The adjustment member 208 is resiliently connected to the retainer 212 by a biasing member or spring 232. In the illustrated embodiment, the biasing member 232 is coupled to the adjustment member 208, and more specifically to the head 216 of the adjustment member 208. The biasing member 232 is also received by the well 224 of the retainer 212.

Referring back to FIG. 11, the insert 128 defines an aperture 236. The aperture 236 receives the retainer 212, and more specifically the tubular portion 228 of the retainer 212. The aperture 236 has an inner diameter that is complementary to an outer diameter of the retainer 212 to allow the insert 128 to slide along a portion of the retainer 212. In the illustrated embodiment, during adjustment of the shaft length of the golf club the insert 128 slides along a portion of the tubular portion 228 of the retainer 212.

Figure 13:
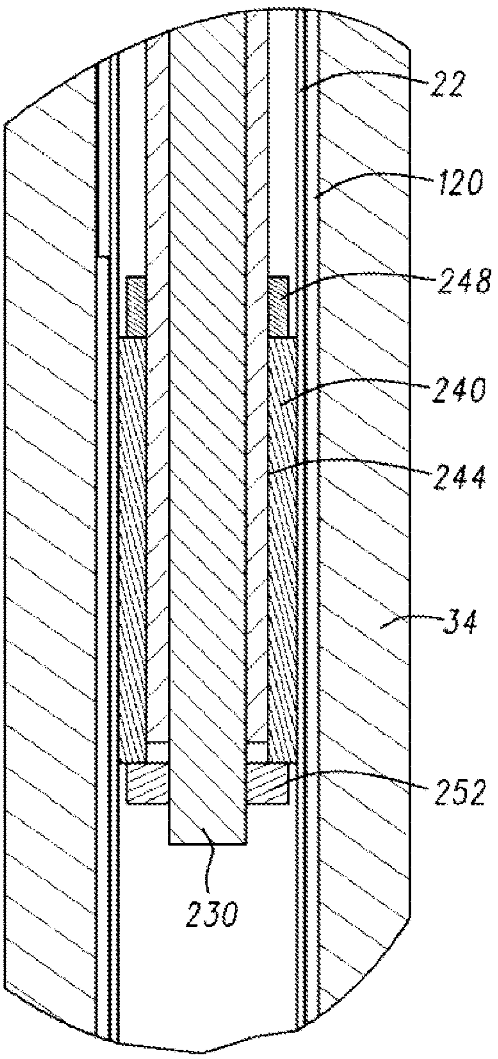
FIG. 13 is a partial cross section view of a portion of the adjustable length shaft assembly of FIG. 9, as detailed in box 13-13 of FIG. 11, and with the grip removed.

As depicted in FIGS. 11 and 13, the compression assembly 204 includes a deformable or elastic member or stopper 240. The elastic member 240 provides a selective expansive force between the first shaft 22 and the tubular portion 228 to selectively retain the compression assembly 204, and the attached second shaft 120, with the first shaft 22. The selective expansive force restricts movement between the first and second shafts 22, 120. In the illustrated embodiment, the elastic member 240 is retained by the compression assembly 204 between the adjustment member 208 and the retainer 212.

In the illustrated embodiment, the elastic member 240 has a generally cylindrical shape and includes a central channel 244 that receives a portion of the compression assembly 204, and more specifically a portion of the retainer 212 that carries a portion of the adjustment member 208. A portion of the adjustment member 208 preferably extends entirely through the elastic member 240. To assist with retention of the elastic member 240, the retainer 212 includes a first compression member retainer 248, while the adjustment member 208 includes a second compression member retainer 252. The first compression member retainer 248 can be a plurality of fins or an annular, ring-like member that projects away from the tubular portion 228 of the retainer 212. The first compression member retainer 248 can be integrally formed with the retainer 212, or in other embodiments, can be attached or otherwise connected to the retainer 248. Preferably, the first compression member retainer 248 has a diameter or circumference larger than a diameter or circumference of the tubular portion 228 of the retainer 212 but smaller than an inner diameter or inner circumference of the first shaft 22.

The second compression member retainer 252 can be an annular, ring-like member that projects away from the member 220 of the adjustment member 208. The second compression member retainer 252 can receive a portion of the member 220, forming a connection by a threaded, screw-like interconnection. In other embodiments, the second compression member retainer 252 can be integrally formed with or otherwise connected to the member 220. Preferably, the second compression retainer 252 has a diameter or circumference larger than a diameter or circumference of the member 220 but smaller than an inner diameter or inner circumference of the first shaft 22.

The biasing member 232 applies tension between the adjustment member 208 and the retainer 212, as the adjustment member 208 is held in place in relation to the retainer 212 by the second compression member retainer 252. As the biasing member 232 applies the biasing force, the second compression member retainer 252 contacts the retainer 212 and/or the elastic member 240 to counteract the biasing force and create tension. In other embodiments of the compression assembly 204, the biasing member 232 can apply tension between any suitable portion of the adjustment member 208 and any suitable portion of the retainer 212. For example, the biasing member 232 can be positioned within the second shaft 120 between a portion of the adjustment member 208 and a portion of the retainer 212. In this example, the adjustment member 208 and the retainer 212 can respectively include projections that contact opposing ends of the biasing member 232 and facilitate application of tension between the adjustment member 208 and the retainer 212. In addition, in other embodiments the biasing member 232 can or can not be connected to one or both of the adjustment member 208 and/or the retainer 212.

The comparative sizing of the first and second compression member retainers 248, 252 in relation to other components provide for retention of the elastic member 240 while also providing axial sliding of the compression assembly 204 (and attached second shaft 120) in relation to the first shaft 22. The comparative sizing is provided for purposes of illustration. In other embodiments, the elastic member 240 and compression member retainers 248, 252 can be of any suitable size, shape, or positioning in relation to one another to permit compression assembly 204 to selectively apply compressive force between the first shaft 22 and the compression assembly 204 to selectively retain the compression assembly 204, and the attached second shaft 120, with the first shaft 22.

The compression assembly 204 is adjustable between a first configuration, as illustrated in FIGS. 11-13, where the compression assembly 204 applies a selective compressive force to the elastic member 240, and a second configuration, which is not illustrated, where the compression assembly 204 does not apply a selective compressive force to the elastic member 240. Specifically, the elastic member 240 has an outer diameter greater in the first configuration than in the second configuration. More specifically, as the compression assembly 204 applies a compressive force to the elastic member 240 in the first configuration, the elastic member 240 expands radially outward from the axial direction of the first and second shafts 22, 120 to engage the first shaft 22. In the second configuration the compressive force is removed from the elastic member 240, and the elastic member 240 contracts radially inward and returns to a relaxed or normal state. In the relaxed state, the elastic member 240 has a size that allows for axial movement within the first shaft 22, or the direction approximately parallel to the axis A (shown in FIGS. 1-2), with the compression assembly 204.

As illustrated in FIG. 11, the adjustable length shaft assembly 200 is provided in the first configuration. The biasing member 232 applies a biasing force against the head 216 of the adjustment member 208 in a first direction 256 away from the club head 14. The biasing force draws the second compression member retainer 252 towards the first compression member retainer 248, decreasing a distance between the first and second compression member retainers 248, 252. The second compression member retainer 252 in turn applies a compressive force to the elastic member 240, expanding the elastic member 240 radially outward from the compression assembly 204 (and radially outward from the axial direction of the first and second shafts 22, 120) to engage with the first shaft 22. As the elastic member 240 expands radially outward between the first shaft 22 and the tubular portion 228 of the retainer 212, it restricts movement of the retainer 212 in relation to the first shaft 22 in the axial direction. Since the second shaft 120 is attached to the retainer 212, the elastic member 240 in turn restricts movement of the second shaft 120 in relation to the first shaft 22, and thus the club length of the golf club 10 can not be adjusted.

To adjust the club length of the golf club 10, a user inserts the torque wrench into the aperture 46 defined by the grip 34 to engage the torque wrench with the socket 108 of the head 216. The user then applies a force by the torque wrench in a direction 260 opposite the biasing force direction 256 sufficient to overcome the biasing force, i.e., which compresses the biasing member 232. As the biasing member 232 compresses, the adjustment member 208 slides within the retainer 212, and more specifically slides in the second direction 260 towards the club head 14. The head 216 slides within the well 224 in the second direction 260 towards the club head 14, while the second compression member retainer 252 moves away from the first compression member retainer 248, increasing the distance between the first and second compression member retainers 248, 252.

The second compression member retainer 252 in turn withdraws the compressive force against the elastic member 240, allowing the elastic member 240 to contract radially inward towards the axial direction of the first and second shafts 22, 120 and disengaging the first shaft 22. Once the elastic member 240 is disengaged from the first shaft 22, the first and second shafts 22, 120 are free to move in relation to one another, and the user can adjust the club length of the golf club 10. The compression assembly 204 is now in the second configuration, which is not illustrated.

More particularly, to adjust the club length of the golf club 10, the user maintains application of the force by the torque wrench in the second direction 260, and then slides the first shaft 22 in relation to the second shaft 120. To increase the club length of the golf club 10, the user slides the first shaft 22 away from the second shaft 120 (in the first direction 256), withdrawing a portion of the first shaft 22 from the second shaft 120. To decrease the club length of the golf club 10, the user slides the first shaft 22 towards the second shaft 120 (in the second direction 260), inserting a portion of the first shaft 22 into the second shaft 120. As the first shaft 22 axially moves in the axial direction (in either the first or second directions 256, 260), the attached insert 128 moves with the first shaft 22. Thus, the insert 128 both axially moves along the tubular portion 228 of the retainer 212, and the slot 124 retains and guides the protrusion 132 on the insert 128. This combination assists with adjusting the first shaft 22 in relation to the second shaft 120 to increase or decrease the club length of the golf club 10, while also restricting rotation of the second shaft 120 in relation to the first shaft 22 to maintain the orientation of the grip 34 in relation to the club head 14 (i.e., restricts rotation of the grip 34 about the first shaft 22). It should be appreciated that the adjustment of the club length by sliding the first shaft 22 in relation to the second shaft 120 is provided for purposes of illustration, and either of the first and second shafts 22, 120 can slide in relation to the other.

Once the user adjusts the first shaft 22 and/or second shaft 120 to the desired club length of the golf club 10, the user withdraws application of the force by the torque wrench in the second direction 260. This leads to a transition of the compression assembly 204 from the second configuration back to the first configuration. The biasing member 232 applies the biasing force to the head 216 of the adjustment member 208 in the first direction 256, drawing the second compression member retainer 252 towards the first compression member retainer 248. The second compression member retainer 252 in turn applies a compressive force to the elastic member 240, expanding the elastic member 240 radially outward to engage with the first shaft 22 and restrict movement of the retainer 212 in relation to the first shaft 22 in the axial direction along axis A (see FIGS. 1-2). This in turn restricts or minimizes movement of the second shaft 120 in relation to the first shaft 22, and thus the club length of the golf club 10 can not be adjusted.

In the illustrated embodiment, the second shaft includes the slot and the insert includes the protrusion. In other embodiments, the second shaft can include more than one slot and the insert can include more than one protrusion. The second shaft can have any number of slots, such as one, two, three, four, five, or any other number of slots. The insert can have any number of protrusions corresponding to the number of slots, such as one, two, three, four, five, or any other number of protrusions. For example, the second shaft can include three slots that correspond to three protrusions on the insert, or the second shaft can include four slots that correspond to four protrusions on the insert. In some embodiments, the slots can be positioned equidistant or asymmetric around the second shaft. Further, the protrusions can be positioned equidistance or asymmetric around the insert.

In other embodiments still, the second shaft can include the one or more protrusions, and the insert can include the one or more slots. In these or other embodiments, the second shaft can have any number of protrusions, such as one, two, three, four, five, or any other number of protrusions. In these or other embodiments, the insert can have any number of slots corresponding to the number of protrusions, such as one, two, three, four, five, or any other number of slots. For example, the second shaft can include three protrusions that correspond to three slots on the insert, or the second shaft can include four protrusions that correspond to four slots on the insert. In some embodiments, the protrusions can be positioned equidistant or asymmetric around the second shaft. Further, the slots can be positioned equidistance or asymmetric around the insert.

FIGS. 14-19 illustrate a third embodiment of the adjustable length shaft assembly 300. The assembly 300 has common elements with the assemblies 100, 200, with the common elements being given the same reference numerals. The third embodiment of the assembly 300 includes a cam lock assembly 304, which is disclosed in additional detail below, to selectively adjust and maintain the length of the golf club 10.

Figure 14:
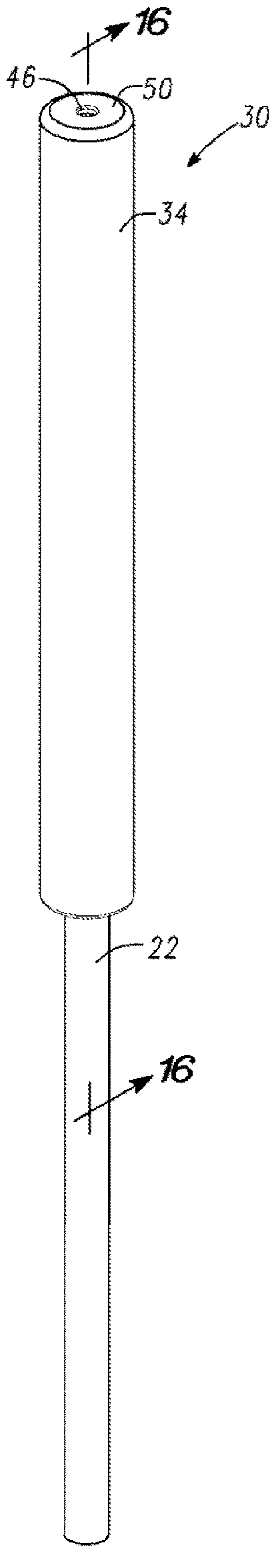
FIG. 14 is a perspective view of a third embodiment of the adjustable length shaft assembly for use with the golf club of FIG. 1.

Referring to FIG. 14, the grip 34 defines the aperture 46 at the second end 50. The aperture 46 provides access to a portion of the cam lock assembly 304 (shown in FIGS. 15-17), and more specifically access to a portion of an adjustment member 308 (shown in FIG. 16) that carries the socket 108 (shown in FIGS. 15-17). The grip 34 is attached to the second shaft 120 (shown in FIGS. 15-16), while not being attached to the first shaft 22.

Figure 15:
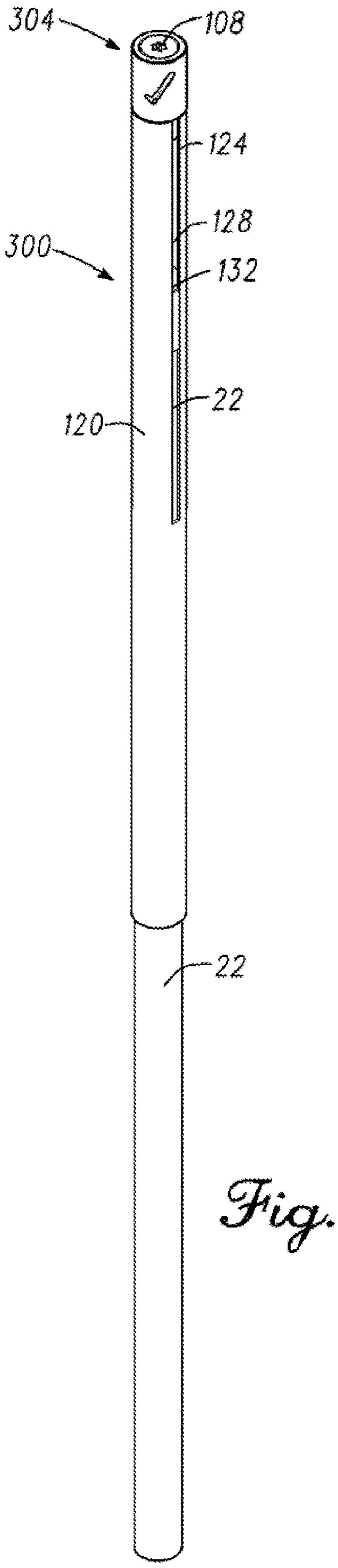
FIG. 15 is a perspective view of the third embodiment of the adjustable length shaft assembly of FIG. 14 with the grip removed.
Figure 16:
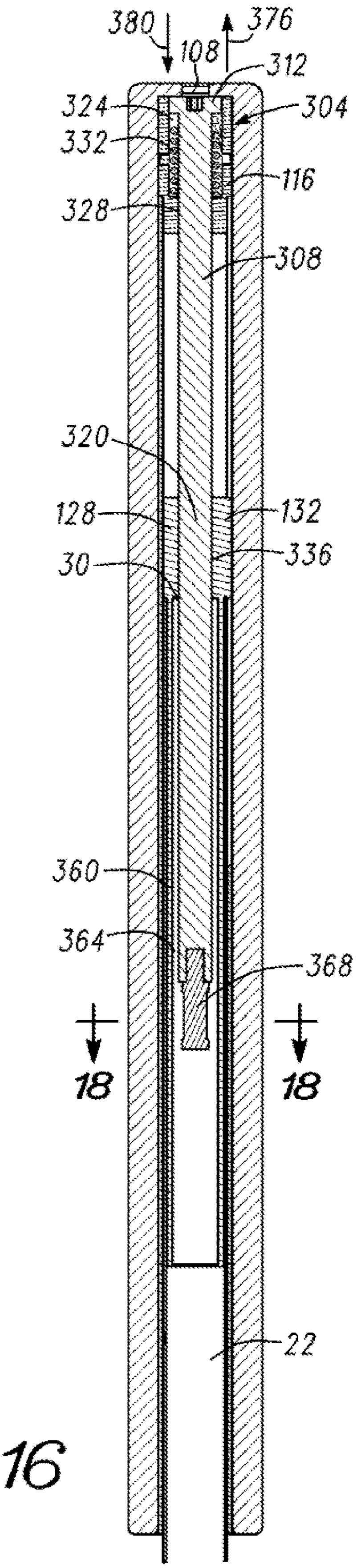
FIG. 16 is a cross section view of a portion of the adjustable length shaft assembly of FIG. 14, taken along line 16-16 of FIG. 14.

As shown in FIGS. 15-16, a portion of the first shaft 22 is received by the second shaft 120 to allow the first and second shafts 22, 120 to axially move in relation to one another. The insert 128 is secured to the second end 30 of the first shaft 22 (shown in FIG. 16). The insert 128 also includes the protrusion 132 that extends beyond an outer circumference of the first shaft 22. The second shaft 120 includes the slot 124 (shown in FIG. 15), which extends axially along the second shaft 120 in a direction from the second end 116 (shown in FIG. 16) towards the club head 14. The protrusion 132 is keyed to be received by the slot 124.

As depicted in FIG. 16, the adjustable length shaft assembly 300 includes an adjustment member 308 and a retainer 312. The adjustment member 308 includes a head or head portion 316 connected to a member or shaft portion 320. The member 320 extends away from the head 316 into the second shaft 120. In the illustrated embodiment, the head 316 has a diameter that is generally greater than the diameter of the member 320. However, in other embodiments, the head 316 can have a diameter that is approximately the same size or generally less than the diameter of the member 320.

The retainer 312 includes a well 324 defining a recess that leads to a channel or aperture 328 provided through the retainer 312. The retainer 312 is received by the second shaft 120 through the second end 116. In addition, the retainer 312, and more specifically the well 324, is attached to the second shaft 120 at the second end 116. The retainer 312 does not rotate or otherwise move independently of the second shaft 120. Instead, the retainer 312 travels with the second shaft 120.

The retainer 312 slidably receives the adjustment member 308, such that the adjustment member 308 slides independently of the retainer 312. More specifically, the recess slidably receives the head 316, while the channel 328 slidably receives a portion of the member 320. To facilitate slidable movement of the adjustment member 308 within the retainer 312, the channel 328 has an inner diameter that is complementary to an outer diameter of the member 320. Similarly, the well 324 has an inner diameter that is complementary to an outer diameter of the head 316. The complementary sizes allows the adjustment member 308 to slide in an axial direction, or a direction approximately parallel to the first and second shafts 22, 120, with respect to the retainer 312.

The adjustment member 308 is resiliently connected to the retainer 312 by a biasing member or spring 332. In the illustrated embodiment, the biasing member 332 is coupled to the adjustment member 308, and more specifically to the head 316 of the adjustment member 308. The biasing member 332 is also received by the well 324 of the retainer 312.

The insert 128 defines an aperture 336. The aperture 336 slidably receives the adjustment member 308, and more specifically a portion of the member 320 of the adjustment member 308. The aperture 336 has an inner diameter that is complementary to an outer diameter of the member 320 to allow the insert 128 to slide along a portion of the member 320.

Figure 17:
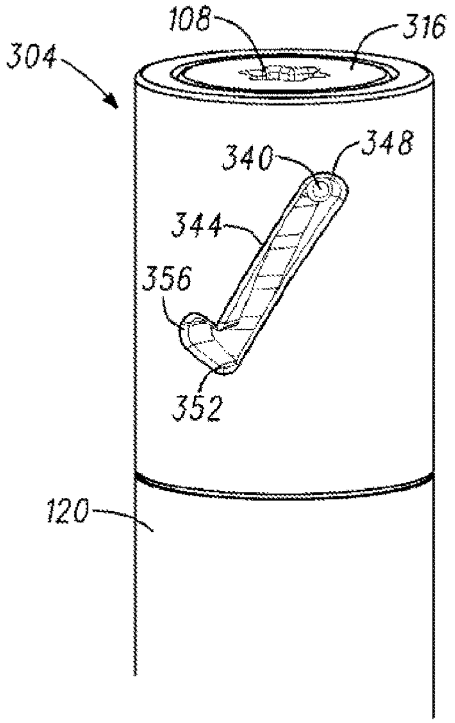
FIG. 17 is a perspective view of a portion of the adjustable length shaft assembly of FIG. 14, as detailed in box 17-17 of FIG. 15, illustrating a portion of the cam lock assembly in an unlocked position.

Referring now to FIG. 17, the cam lock assembly 304 includes a cam member 340 that projects from the adjustment member 308. In the illustrated embodiment, the cam member 340 projects from the head 316. The cam member 340 is received by a slot 344 provided in the retainer 312. The slot 344 includes a first end 348 opposite a second end 352, and is provided at an angle relative to the axis A (shown in FIGS. 1-2) with the second end 352 being positioned closer to the second shaft 120 than the first end 348. An offset locking portion or groove 356 is in communication with the slot 344. In the illustrated embodiment, the locking portion 356 is provided at the second end 352 of the slot 344 at an angle relative to the slot 344. In addition, the locking portion 356 is provided further away from the second shaft 120 than the second end 352.

Figure 18:
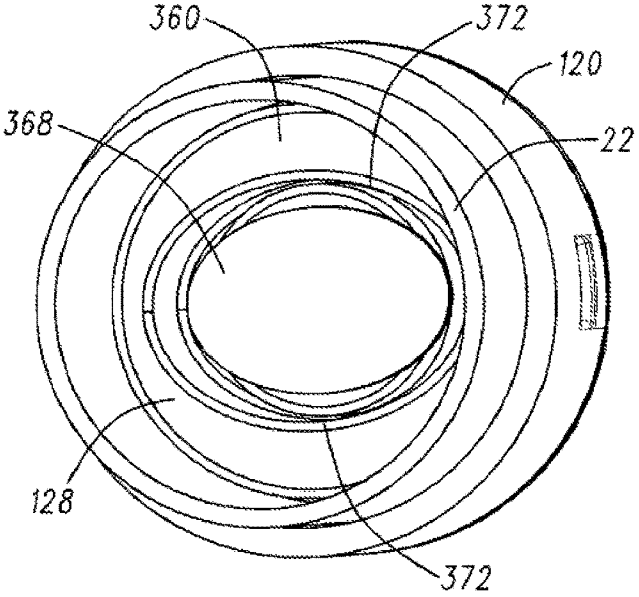
FIG. 18 is a perspective view of a portion of the adjustable length shaft assembly of FIG. 14, taken along line 18-18 of FIG. 16, illustrating a portion of the cam lock assembly in an unlocked position.
Figure 19:
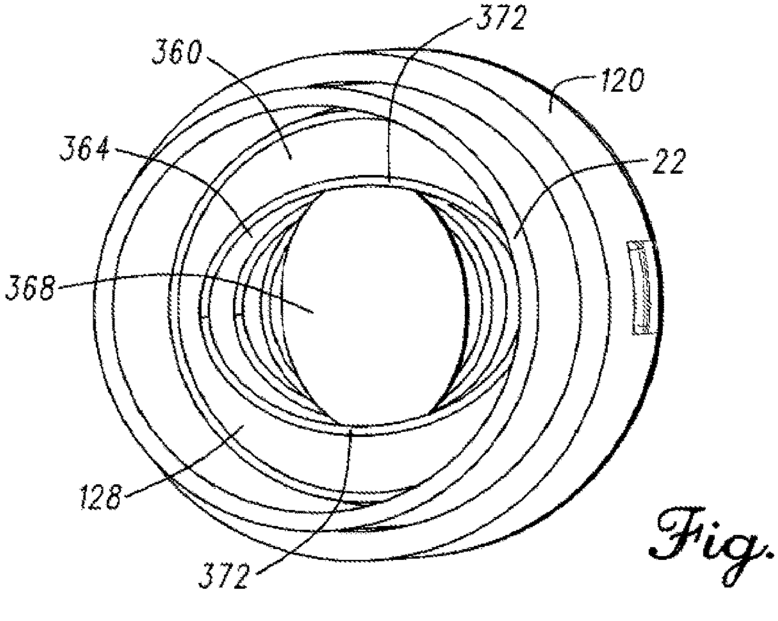
FIG. 19 is a perspective view of a portion of the cam lock assembly of FIG. 18, illustrating a portion of the cam lock assembly in a locked position.

Referring to FIGS. 16, 18, and 19, the insert 128 also includes an extension 360 that extends towards the club head 14. The insert 128, by the extension 360, defines a channel 364 that receives a portion of the adjustment member 308, and more specifically a portion of the member 320 that forms a cam portion 368. The channel 364 has a geometry that allows the adjustment member 308 and associated cam portion 368 to slide within the channel 364 when the cam lock assembly 304 is in a first or unlocked configuration, and does not allow the adjustment member 308 and associated cam portion 368 to slide within the channel 364 when the cam lock assembly 304 is in a second or locked configuration. The biasing member 332 applies tension between the adjustment member 308 and the retainer 312, as the adjustment member 308 is held in place in relation to the retainer 312 by the cam portion 368. As the biasing member 332 applies the biasing force, the cam portion 368 contacts the channel 364 and/or the insert 128 to counteract the biasing force and create tension. In other embodiments of the adjustable length shaft assembly 300, the biasing member 332 can apply tension between any suitable portion of the adjustment member 308 and any suitable portion of the retainer 312. In this example, the adjustment member 308 and the retainer 312 can respectively include projections within the second shaft 120 that contact opposing ends of the biasing member 332 and facilitate application of tension between the adjustment member 308 and the retainer 312. In addition, in other embodiments the biasing member 332 can or can not be connected to one or both of the adjustment member 308 and/or the retainer 312.

FIG. 18 illustrates the adjustment member 308 and associated cam portion 368 in the first or unlocked configuration. The channel 364 has a complementary geometry to the cam portion 368 such that the cam portion 368 is free to slide within the channel 364. In turn, the first and second shafts 22, 120 are free to be moved in relation to one another, allowing for adjustment of the club length of the golf club 10.

FIG. 19 illustrates the adjustment member 308 and associated cam portion 368 in the second or locked configuration. As the cam portion 368 moves from the first configuration to the second configuration, the channel 364 has opposing cam surfaces 372 that respectively engage the cam portion 368 to form a friction fit or press fit or interference fit. The friction fit retains the adjustment member 308 to the insert 128. This in turn locks the second shaft 120 (coupled to the adjustment member 308 by the retainer 312) to the first shaft 22 (coupled to the insert 128), restricting adjustment of the club length of the golf club 10. While the illustrated embodiment of the channel 364 and the cam portion 368 are depicted with a generally oval cross-sectional shape, in other embodiments the channel 364 and the cam portion 368 can have any suitable complementary geometry to allow sliding movement of the cam portion 368 in the channel 364 in the unlocked configuration, and to not allow sliding movement of the cam portion 368 in the channel 364 in the locked configuration by forming a friction fit between the cam portion 368 and one or more cam surfaces 372.

As illustrated in FIGS. 15-18, the adjustable length shaft assembly 300 is provided in the first or unlocked configuration. The cam lock assembly 304 is in the unlocked configuration, with the cam member 340 positioned within the slot 344 proximate the first end 348. To assist with maintaining the cam member 340 in the unlocked configuration, the biasing member 332 uses a portion of the well 324 to apply a biasing force against the head 316 of the adjustment member 308 in a first direction 376 (shown in FIG. 16) away from the club head 14. The cam portion 368 of the adjustment member is keyed or aligned with the channel 364 of the insert 128 to allow the cam portion 368 to slide within the channel 364. In turn, the second shaft 120, which carries the adjustment member 308 by the attached retainer 312, is movable in relation to the first shaft 22, which carries the insert 128. Thus in the unlocked configuration, the first and second shafts 22, 120 can be axially moved in relation to one another to adjust the club length of the golf club 10.

To adjust the club length of the golf club 10, a user can axially slide the first shaft 22 in relation to the second shaft 120. To decrease the club length of the golf club 10, the user slides the first shaft 22 towards the second shaft 120 (in the first direction 376), further inserting the first shaft 22 into the second shaft 120. To increase the club length of the golf club 10, the user slides the first shaft 22 away from the second shaft 120 (in a second direction 380, shown in FIG. 16), withdrawing the first shaft 22 from the second shaft 120. As the first shaft 22 axially moves in the axial direction (in either the first or second directions 376, 380), the attached insert 128 moves with the first shaft 22. Thus, the insert 128 axially moves along the member 320 of the adjustment member 308 by the aperture 336, the cam portion 368 axially moves within the channel 364 defined by the insert 128, and the slot 124 in the second shaft 120 retains and guides the protrusion 132 on the insert 128. This combination assists with adjusting the first shaft 22 in relation to the second shaft 120 to increase or decrease the club length of the golf club 10. The protrusion 132 being keyed to slide within the slot 124 restricts rotation of the second shaft 120 in relation to the first shaft 22 to maintain the orientation of the grip 34 in relation to the club head 14.

Once the user adjusts the first shaft 22 and/or second shaft 120 to the desired club length of the golf club 10, the user transitions the cam lock assembly 304 from the unlocked configuration to the locked configuration. The user inserts the torque wrench into the aperture 46 defined by the grip 34 to engage the torque wrench with the socket 108 of the head 316. The user then applies a rotating force by the torque wrench in a first rotational direction, which is clockwise in the illustrated embodiment. Rotation of the torque wrench in the first rotational direction rotates the head 316, the attached cam member 340, and generally the adjustment member 308.

During rotation, the cam member 340 slides along the slot 344, moving from the first end 348 towards the second end 352. The slot 344 translates the rotational force from the torque wrench into a linear force that overcomes the biasing force imparted by the biasing member 332. This results in the adjustment member 308 sliding along the axis A (shown in FIGS. 1-2) in relation to both the retainer 312 and the insert 128 in the second direction 380 (towards the club head 14). The cam portion 368 concurrently rotates within the channel 364 from the unlocked configuration (shown in FIG. 18) towards the locked configuration (shown in FIG. 19), with one or more cam surfaces 372 of the channel 364 engaging the cam portion 368.

With reference to FIG. 17, when the cam member 340 reaches the second end 352 of the slot 344, continued rotation of the torque wrench in the first rotational direction directs the cam member 340 into the locking portion 356 offset from the slot 348. Once the cam member 340 is received in the locking portion 356, the user can no longer rotate the adjustment member 308 by the head 316. The biasing force applied by the biasing member 332 against the head 316 in the first direction 376 (shown in FIG. 16) keeps the cam member 340 within the locking portion 356. The cam lock assembly 308 is now in the locked configuration. In addition, the one or more cam surfaces 372 of the channel 364 engage the cam portion 368 to form the friction fit that locks the adjustment member 308 (and the attached second shaft 120) to the channel 364 defined by the insert 128 (and the attached first shaft 22). In the locked configuration, relative movement of the first shaft 22 and the second shaft 120 is restricted or minimized, and thus the club length of the golf club 10 can not be adjusted. The user is free to withdraw the torque wrench from the socket 108 of the head 316.

To transition the cam lock assembly 304 from the locked configuration to the unlocked configuration, the user inserts the torque wrench into the socket 208 and applies torsional and downward force in the second direction 380 (or towards the club head 14) to overcome the biasing force applied by the biasing member 332 against the head 316. While applying the downward force on the head 316, the user rotates the torque wrench in a second rotational direction, which is counterclockwise in the illustrated embodiment. This disengages the cam member 340 from the locking portion 356 and moves the cam member 340 towards the second end 352 of the slot 344. Continued rotation in the second rotational direction further rotates the head 316, and moves the cam member 340 along the slot 344 from the second end 352 to the first end 348. It should be appreciated that the biasing force applied on the head 316 by the biasing member 332 contributes to moving the cam member 340 to the first end 348 of the slot 344. As the head 316 rotates, the cam portion 368 rotates within the channel 364 about the insert 124 from the locked configuration (shown in FIG. 19) towards the unlocked configuration (shown in FIG. 18), with one or more cam surfaces 372 of the channel 364 disengaging the cam portion 368. Once the cam member 340 reaches the first end 348 of the slot 344 (shown in FIG. 17), the cam lock assembly 304 is in the unlocked configuration. In this unlocked configuration, the club length of the golf club 10 can be freely adjusted, as previously described.

It should be appreciated that the geometry of the cam lock assembly 304, and more specifically the slot 344 and associated offset locking portion 356 are provided for purposes of illustration. In other embodiments, the geometry can be adjusted while maintaining the same function. For example, the geometry can be such that to rotate the adjustment member 308 from the unlocked configuration to the locked configuration, the user rotates the torque wrench in a first rotational direction, which is counterclockwise rotation of the torque wrench. Similarly, to rotate the adjustment member 308 from the locked configuration to the unlocked configuration, the user rotates the torque wrench in a second rotational direction, which is clockwise rotation of the torque wrench.

It should also be appreciated that in other embodiments, aspects of the adjustable length shaft assembly 300 can be modified, added, or removed while continuing to selectively adjust and maintain the length of the golf club 10. For example, in an embodiment of the adjustable length shaft assembly 300, the cam lock assembly 304 does not include the biasing member 332, cam member 340, or slot 344. Instead, the cam lock assembly 304 includes the cam portion 368 that rotates within the channel 364 between the unlocked configuration (shown in FIG. 18) and the locked configuration (shown in FIG. 19) as otherwise previously described.

In another embodiment of the adjustable length shaft assembly 300, the biasing member 332, cam member 340, and slot 344 of the cam lock assembly 304 are replaced by a plurality of threads that extend around an outer circumference or perimeter of the head 316 that cooperate with threads that extend around the recess defined by the well 324. Rotation of the head 316 forms translational motion of the adjustment member 308 in the axial direction.

In another embodiment of the adjustable length shaft assembly 300, the slot 344 is positioned perpendicular to the axis A (shown in FIGS. 1-2) to define a travel limitation for the head 316. Thus, rotation of the head 316 results in rotation, but not translational motion, of the adjustment member 308.

FIGS. 24-27 illustrate a fourth embodiment of the adjustable length shaft assembly 500. The assembly 500 has common elements with assembly 100, with the common elements being given the same reference numerals.

Figure 24:
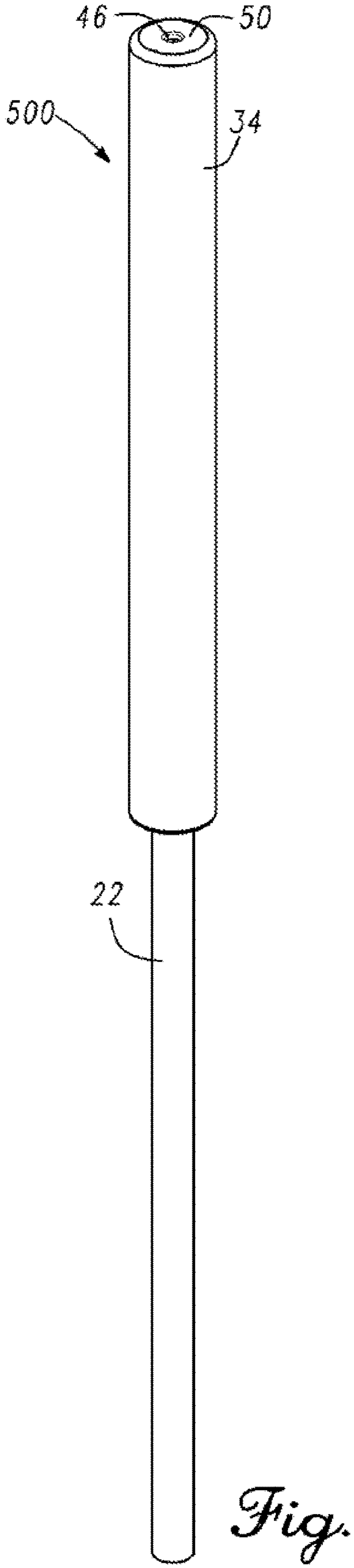
FIG. 24 is a perspective view of a fourth embodiment of the adjustable length shaft assembly for use with the golf club of FIG. 1.
Figure 25:
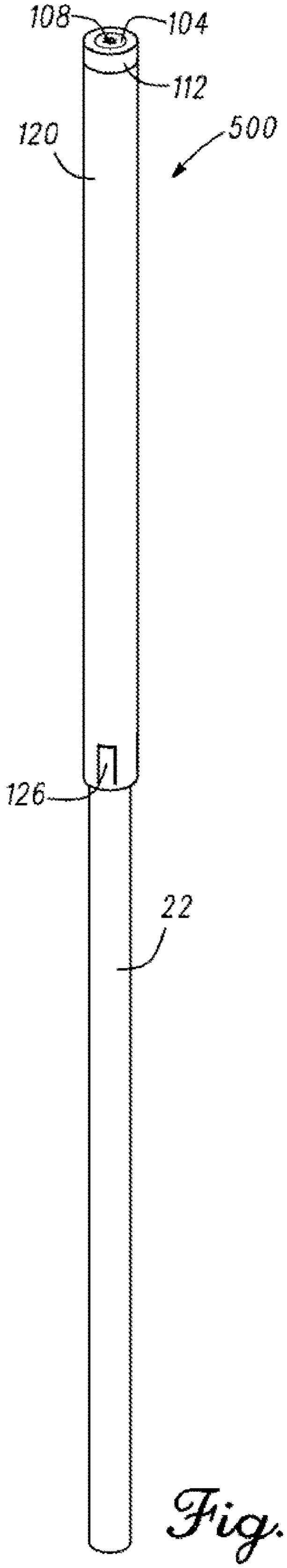
FIG. 25 is a perspective view of the fourth embodiment of the adjustable length shaft assembly of FIG. 24 with the grip removed.

Referring to FIGS. 24-25, the screw head 104 is received by the retainer 112 that is static with respect to the second shaft 120, but allows for rotation of the screw head 104. The second shaft 120 includes an inner surface 122 that is configured to receive an outer surface 130 of the insert 128. Both the second shaft 120 and the insert are devoid of a slot and protrusion (see FIGS. 26-27).

Figure 26:
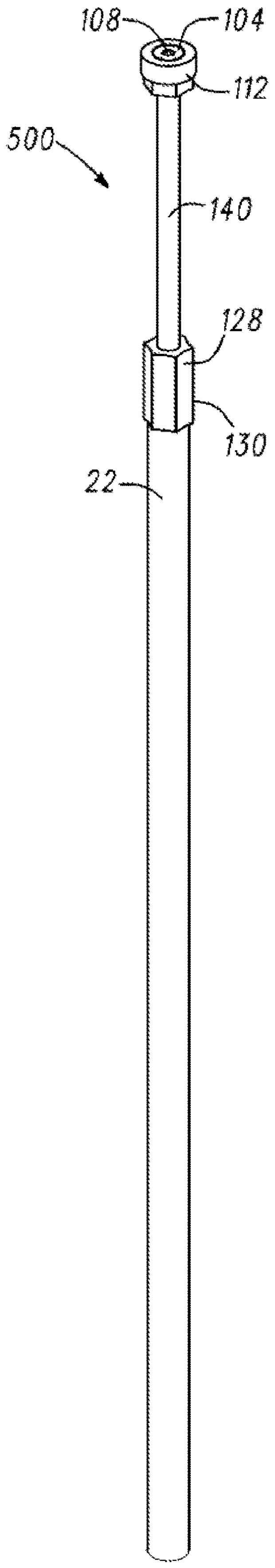
FIG. 26 is a perspective view of the fourth embodiment of the adjustable length shaft assembly of FIG. 24 with the grip and second shaft removed.
Figure 27:
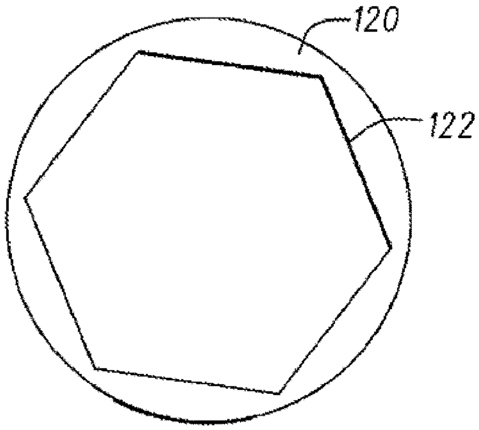
FIG. 27 is a cross sectional view of the second shaft of the fourth embodiment of the adjustable length shaft assembly of FIG. 24.

Referring to FIGS. 26-27, the inner surface 122 of the second shaft 22 includes a cross sectional shape that is substantially hexagonal. The outer surface 130 of the insert 128 includes a cross sectional shape that is substantially hexagonal, corresponding to the inner surface 122 of the second shaft 120. The cross sectional shapes of the inner surface 122 of the second shaft 120 and the outer surface 130 of the insert 128 restrict rotation of the second shaft 120 relative to the first shaft 22, similar to the slot 124 and protrusion 132 in the first embodiment of the adjustable length shaft assembly 100.

In the illustrated embodiment, the inner surface 122 of the second shaft 120 and the outer surface 130 of the insert 128 are substantially hexagonal in cross sectional shape. In other embodiments, the cross sectional shape of the inner surface 122 of the second shaft 120 and the outer surface 130 of the insert can be any shape capable of restricting rotational motion between the second shaft 120 and the insert 128. For example, the cross sectional shape of the inner surface 122 of the second shaft 120 and the outer surface 130 of the insert 128 can be a polygon or a shape with at least one curved surface, such as a semi-circle, triangle, square, rectangle, pentagon, hexagon, or any other shape.

Referring to FIG. 25, the second shaft 120 further includes one or more tabs 126. The tabs 126 are angled toward the first shaft 22 to provide a secure fit between the second shaft 120 and the first shaft 22. In the illustrated embodiment, the second shaft 120 includes three tabs 126. Each of the three tabs 126 are spaced equidistant from one another. In other embodiments, the second shaft 120 can include any number of tabs 126. For example, the second shaft 120 can include one, two, three, four, five, or any other number of tabs 126.

Figure 28:
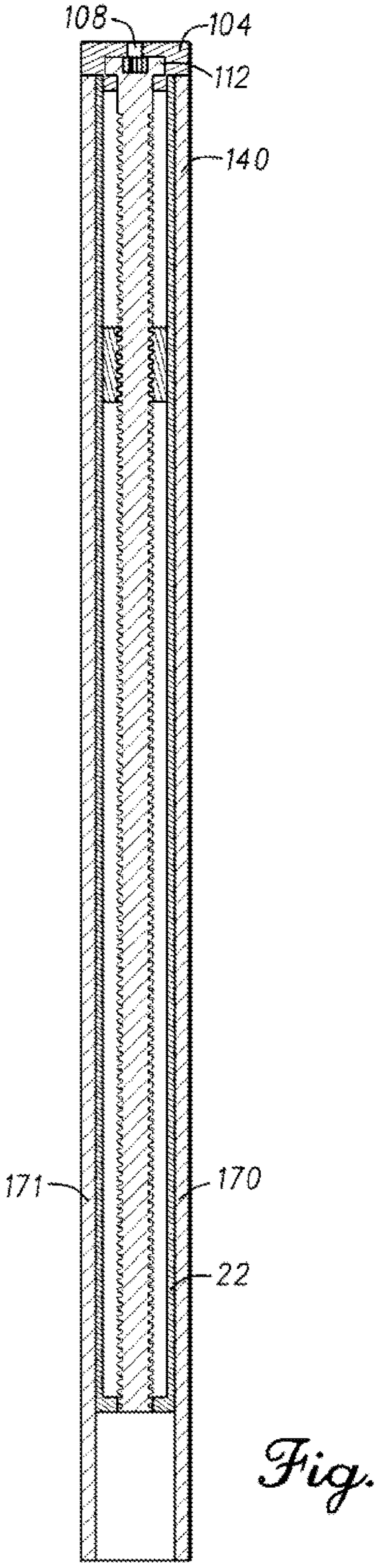
FIG. 28 is a cut away side view of an alternative to the fourth embodiment of the adjustable length shaft assembly of FIG. 24 with the grip removed.

Further, in other embodiments, the second shaft 120 can include a gasket in addition to or instead of the tabs 126. The second shaft 120 can have one or more grooves (171) to receive the gasket 170. The second shaft 120 can have one, two, three, or four grooves (171) to receive the gasket 170. The gasket 170 can be made of rubber, polyurethane, a polymeric material or any other material capable of providing a secure fit between the first shaft 22 and the second shaft 120 (FIG. 28). Further, the second shaft 120 having the gasket 170 can travel the length of the threaded screw 140, but limiting side to side movement between the first shaft 22 and the second shaft 120.

Further, in other embodiments, the second shaft 120 can include an overmolded section that provides a secure fit between the second shaft 120 and the first shaft 22 (not shown). The second shaft 120 can have the overmolded section in the bottom 0.5 inches, 1.0 inches, 1.5 inches, 2.0 inches or 2.5 inches of the second shaft 120. This overmolded section may comprise a polymeric material, rubber, a like rubber material, or any other material capable of providing a secure fit between the first shaft 22 and the second shaft 120 (not shown). Further, the second shaft 120 having the overmolded section can travel the length of the threaded screw 140 limiting side to side movement between the first shaft 22 and the second shaft 120.

The adjustable length shaft assembly 500 described herein can be operated in the same manner as the adjustable length shaft assembly 100, as described above, wherein restricting rotational motion of the first shaft 22 relative to the second shaft 120 is achieved with the cross sectional shapes of the inner surface 122 of the second shaft 120 and the outer surface 130 of the insert 128, instead of the slot and protrusion mechanism.

FIGS. 30-38 illustrate a fifth embodiment of the adjustable length shaft assembly 800. The assembly 800 has common elements with assembly 100 and assembly 500, with the common elements being given the same reference numerals.

Referring to FIGS. 31-34, the screw head 104 is received by a retainer 812 that is static with respect to the second shaft 120, but allows for rotation of the screw head 104. The retainer 812 is itself received by the second end or butt end 116 of the second shaft 120. The second shaft 120 further includes a first end 118 opposite the second end 116. The second shaft 120 includes an inner surface 122 that is configured to receive an outer surface 114 of the retainer 812.

In the illustrated embodiment, the retainer 812 includes two half circle pieces. The two pieces of the retainer 812 snap fit into the second end 116 of the second shaft 120 to improve the concentricity of the threaded screw 140 within the second shaft 120. The improved concentricity better aligns the first shaft 22 within the second shaft 120. To achieve the improved concentricity, the outer surface 114 of the retainer 812 further includes one or more pegs 818. The one or more pegs 818 extend outward from the outer surface 114 of the retainer 812 and are configured to be received by one or more apertures 820 disposed on the second shaft 120. The interlocking geometry between the pegs 818 and the apertures 820 allows the retainer 812 to remain static with respect to the second shaft 120, but allow for rotation of the screw head 104.

The inner surface 122 of the second shaft 120 includes a cross sectional shape that is substantially hexagonal. The outer surface 114 of the retainer 812 includes a cross sectional shape that is substantially hexagonal, corresponding to the inner surface 122 of the second shaft 120. The cross sectional shapes of the inner surface 122 of the second shaft 120 and the outer surface 114 of the retainer 812 allows the retainer 812 to remain static within the second shaft 120, while still allowing for the threaded screw 140 to rotate.

In other embodiments, the cross sectional shape of the outer surface 114 of the retainer 812 can be any shape capable allowing the retainer 812 to remain static within the second shaft 120. For example, the cross sectional shape of the outer surface 114 of the retainer 812 can be a polygon or a shape with at least one curved surface, such as a semi-circle, triangle, square, rectangle, pentagon, hexagon, or any other shape.

Figure 32:
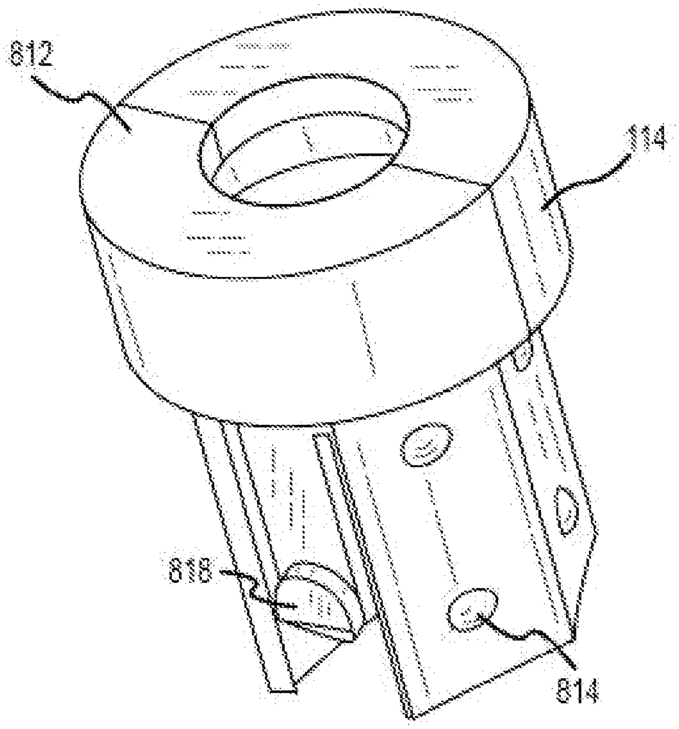
FIG. 32 is a perspective view of the retainer of the fifth embodiment of the adjustable length shaft assembly of FIG. 30.
Figure 34:
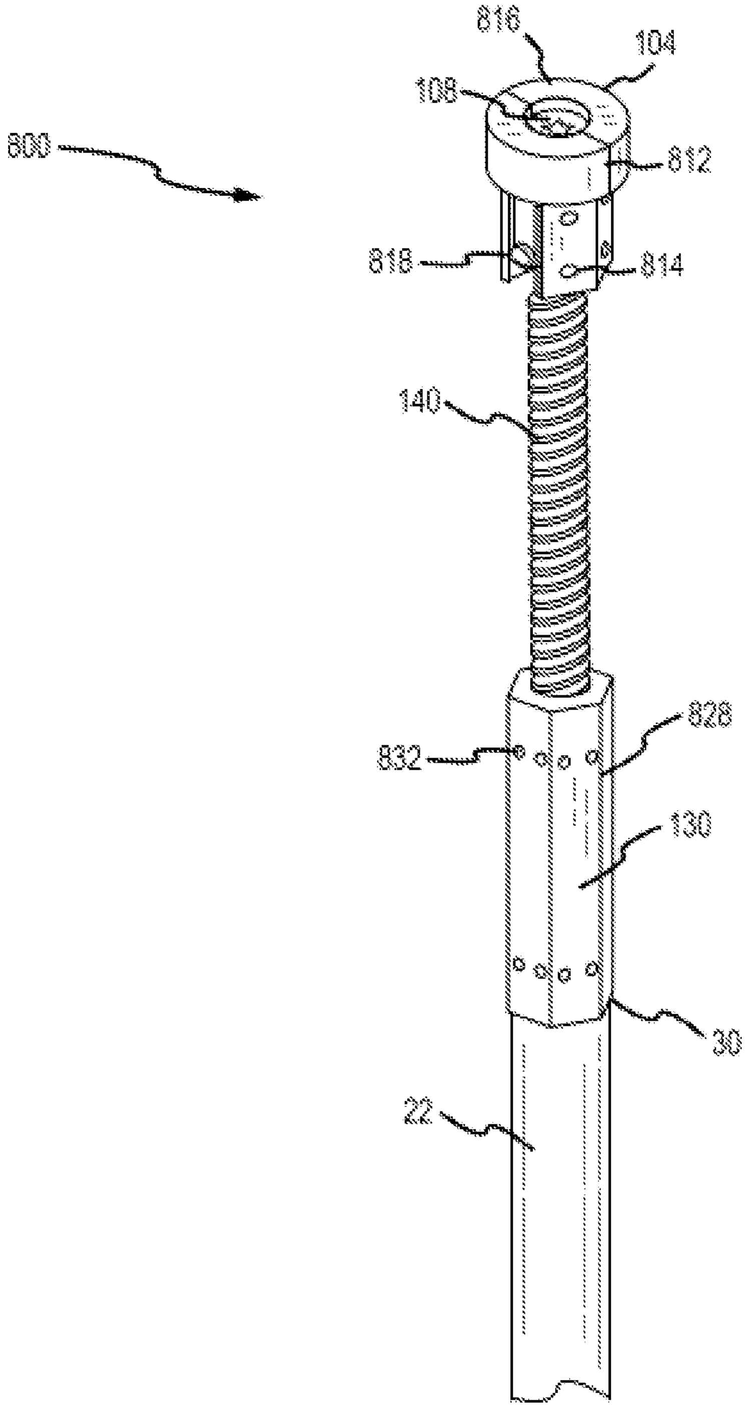
FIG. 34 is a perspective view of the fifth embodiment of the adjustable length shaft assembly of FIG. 20 with the grip and second shaft removed.

Further, as illustrated in FIGS. 32 and 34, the outer surface 114 of the retainer 812 includes a plurality of nodal protrusions 814. The nodal protrusions 814 extend outward from the outer surface 114 of the retainer 812. The nodal protrusions 814 can be point-like protrusions or projections that extend outward from the outer surface 114 of the retainer 812. The nodal protrusions 814 are configured to abut or press against the inner surface 122 of the second shaft 120. The nodal protrusions 814 provide a secure fit between the retainer 112 and the second shaft 120. The nodal protrusions 814 further improve the concentricity of the threaded screw 140 within the second shaft 120.

As illustrated in FIG. 34, the retainer 812 includes an axial end face 816. The axial end face 816 of the retainer 812 is adjacent to the second end 116 of the second shaft 120. The retainer 812 further includes an axial length measured from the retainer axial end face 816 in a direction from the second end 116 to the first end 118 of the second shaft 120. In some embodiments, the nodal protrusions 814 can be located closer to the retainer axial end face 816. In other embodiments, the nodal protrusions 814 can be located away from the retainer axial end face 816. The nodal protrusions 814 of the retainer 812 can be positioned at a location of at least 25% of the axial length of the retainer 812. In other embodiments, the nodal protrusions 814 of the retainer 812 can positioned at a location of at least 30%, 35%, 40%, 45%, 50%, 55%, 60%, 65%, 70%, 75%, or 80% of the axial length of the retainer 812. In other embodiments still, the nodal protrusions 814 of the retainer 812 can be positioned on at least one side of the hexagonal retainer 812. In other embodiments, the nodal protrusions 814 of the retainer 812 can be positioned on one, two, three, four, five, or six sides of the hexagonal retainer 812.

The nodal protrusions 814 can include a shape that is substantially spherical. In other embodiments, the nodal protrusions 814 can be any shape capable of abutting or pressing against the inner surface 122 of the second shaft 120. For example, the shape of the nodal protrusions 814 can be a semi-circle, or a shape with at least one curved surface, such as a hemi-sphere, cylinder, triangle, square, rectangle, pentagon, hexagon, polygon, or any other shape.

In the illustrated embodiment, the outer surface 114 of the retainer 812 includes 8 nodal protrusions 814, where 2 nodal protrusions 814 are positioned on the sides of the hexagonal retainer 812. In other embodiments, the retainer 812 can include any number of nodal protrusions 814. For example, the retainer 812 can include 4-24, 4-18, or 4-12 nodal protrusions 814. In other examples, the retainer 812 can include 4, 5, 6, 7, 8, 9, 10, 11, 12, 13, 14, 15, 16, 17, 18, 19, 20, 21, 22, 23, or 24 nodal protrusions 814.

Figure 35:
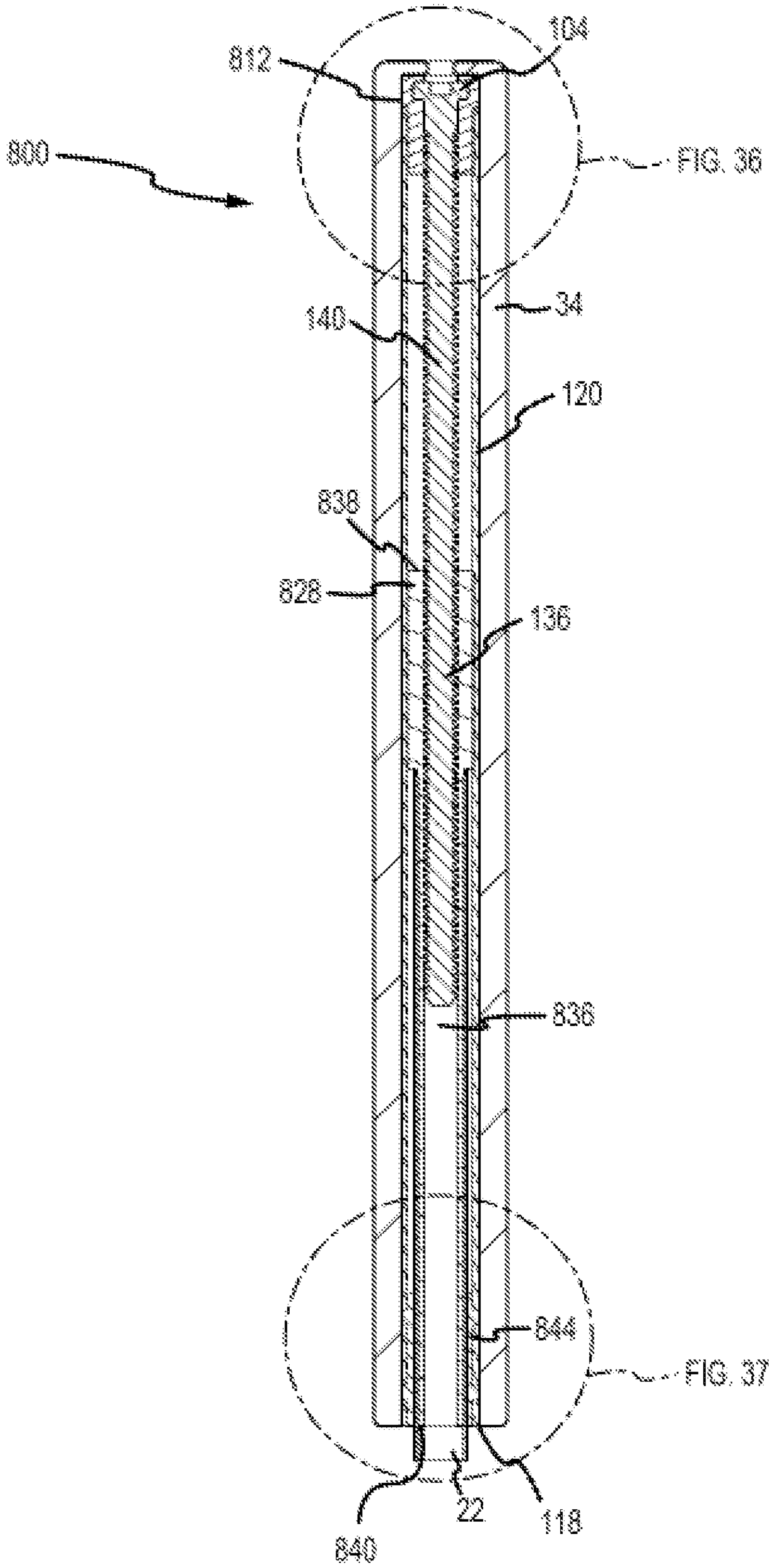
FIG. 35 is a cross section view of a portion of the adjustable length shaft assembly of FIG. 30, taken along line 35-35 of FIG. 30.
Figure 36:
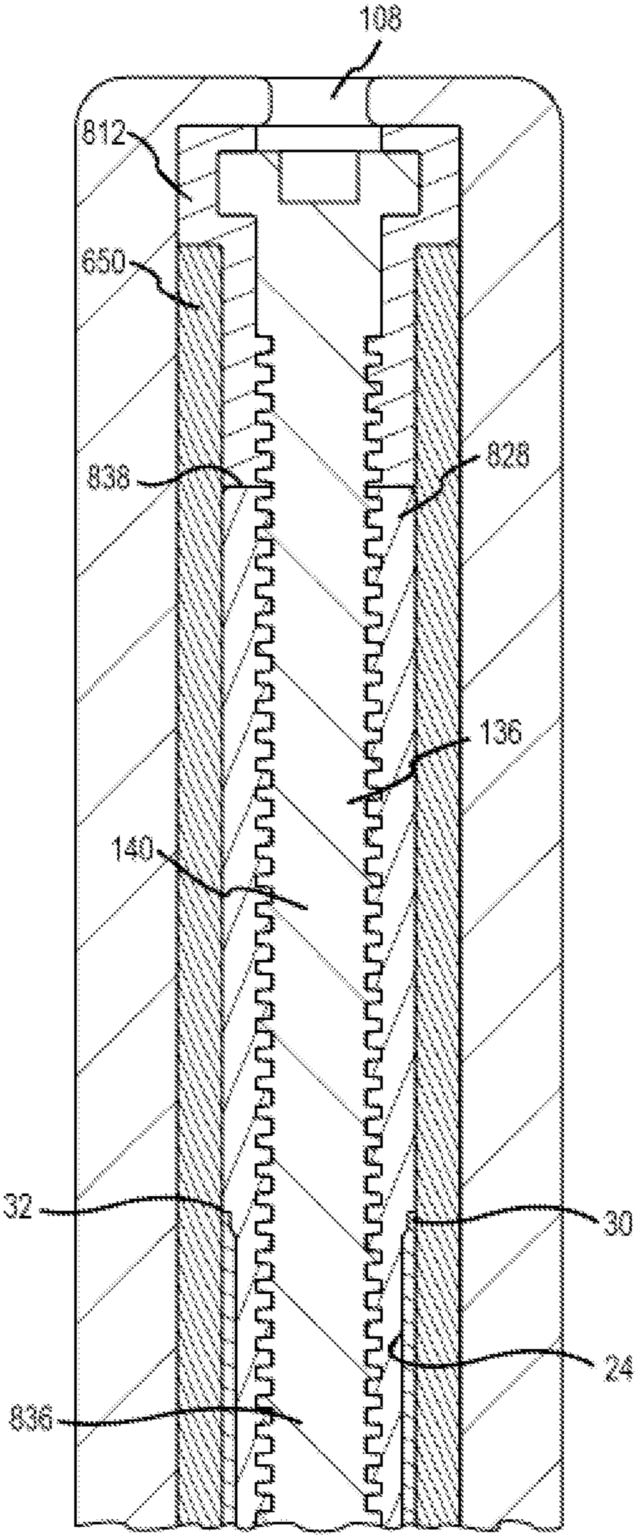
FIG. 36 is a partial cross section view of a portion of the adjustable length shaft assembly of FIG. 30, as shown in a detailed circle in FIG. 35.

FIGS. 34-36 depicts an insert 828 that is received in the second end 30 of the first shaft 22. The insert 828 also defines a threaded aperture 136, and a tubular portion 836 devoid of threads. The inner surface 122 of the second shaft 120 is configured to receive an outer surface 130 of the insert 828. The insert 128 is configured to be coupled, attached, or secured to the second end 30 of the first shaft 22. The outer surface 130 of the insert 828 is configured to be coupled, attached, or secured to an inner surface 24 of the first shaft 22 at the second end 30. Stated another way, the insert 828 is coupled, attached, or secured to an end face or an axial end face 32 of the first shaft 22. The insert 828 can be coupled, attached, or secured to the first shaft 22 with adhesive, epoxy, glue, or any other suitable adhesive. In some embodiments, the insert 828 is permanently coupled, attached, or secured to the axial end face 32 of the first shaft 22.

The insert 828 defines a first axial end face 838 and a second axial end face 840. The first axial end face 838 is located closer to the second end 116 of the second shaft 120. The second axial end face 840 is located closer to the first end 118 of the second shaft 120. The insert 828 extends into a portion of the first shaft 22 and engages with the first shaft 22, where the second axial end face 840 is located within the first shaft 22. The engagement between the insert 828 and the first shaft 22 defines an engagement length. The engagement length is defined as an axial length between the axial end face 32 of the first shaft 32 and the second axial end face 840 of the insert 828. The engagement length between the insert 828 and the first shaft 22 improves the stiffness of the adjustable shaft length assembly 800 thereby limiting side to side movement or radial movement between the first shaft 22 and the second shaft 120 during operation of the adjustable shaft length assembly 800. The insert 828 can engage a larger portion of the first shaft 22 to improve the alignment of the first shaft 22 within the second shaft 120. Better alignment of the first shaft 22 reduces misalignment thereby allowing the first shaft 22 to freely translate without interfering with the second shaft 120.

In the illustrated embodiment, the engagement length between the insert 828 and the first shaft 22 is 5.0 inches. In other embodiments, the engagement length can be 2-10 inches. In other embodiments, the engagement length can be 2-5, or 5-10 inches. In other embodiments still, the engagement length can be 2-6, 3-7, 4-8, 5-9, or 6-10 inches. For example, the engagement length can be 2, 3, 4, 5, 6, 7, 8, 9, or 10 inches.

Figure 33:
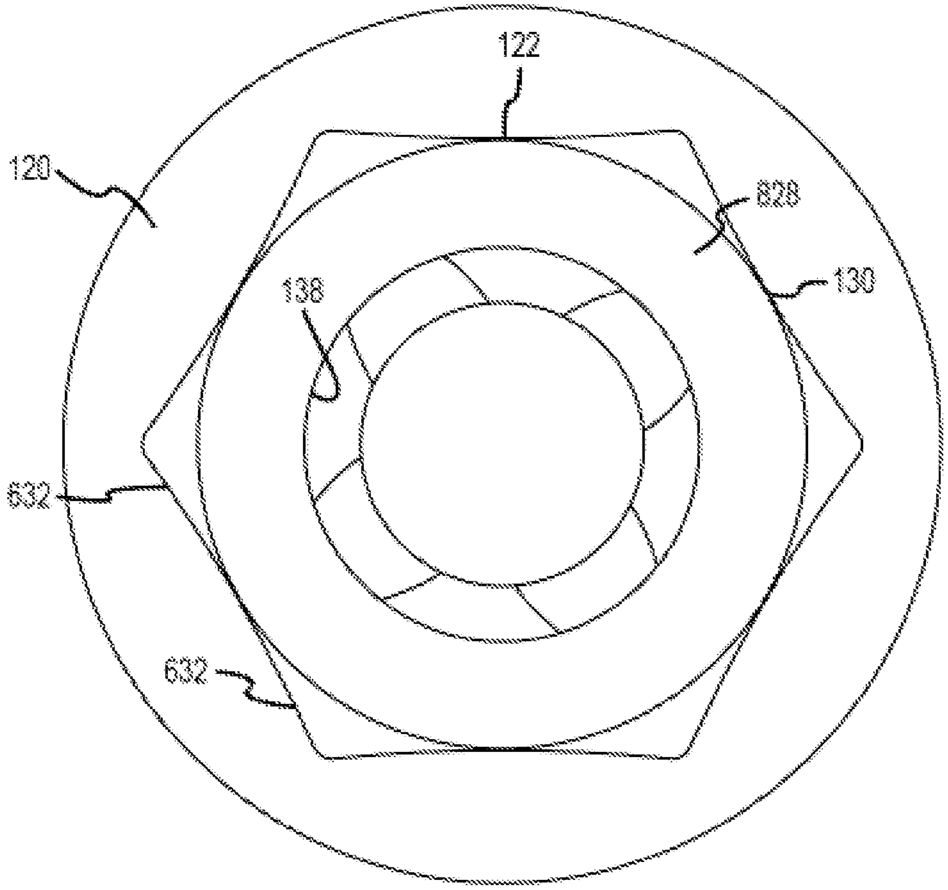
FIG. 33 is a cross sectional view of the second shaft of the fifth embodiment of the adjustable length shaft assembly of FIG. 30 with the grip removed.

Referring to FIG. 33, the outer surface 130 of the insert 828 includes a cross sectional shape that is substantially hexagonal. As described above, the inner surface 122 of the second shaft 120 includes a hexagonal cross sectional shape. The outer surface 130 of the insert 128 corresponds to the inner surface 122 of the second shaft 120. The cross sectional shapes of the inner surface 122 of the second shaft 120 and the outer surface 130 of the insert 828 restricts rotation of the second shaft 120 relative to the first shaft 22. Restricting rotation of the second shaft 120 relative to the first shaft 22 with cross sectional shapes can be similar to how the slot 124 and protrusion 132 of the adjustable length shaft assembly 100 restricts rotation of the second shaft 120 relative to the first shaft 22.

In the illustrated embodiment, the inner surface 122 of the second shaft 120 and the outer surface 130 of the insert 828 are substantially hexagonal in cross sectional shape. In other embodiments, the cross sectional shape of the inner surface 122 of the second shaft 120 and the outer surface 130 of the insert can be any shape capable of restricting rotational motion between the second shaft 120 and the insert 828. For example, the cross sectional shape of the inner surface 122 of the second shaft 120 and the outer surface 130 of the insert 828 can be a polygon or a shape with at least one curved surface, such as a semi-circle, triangle, square, rectangle, pentagon, hexagon, or any other shape.

Figure 38:
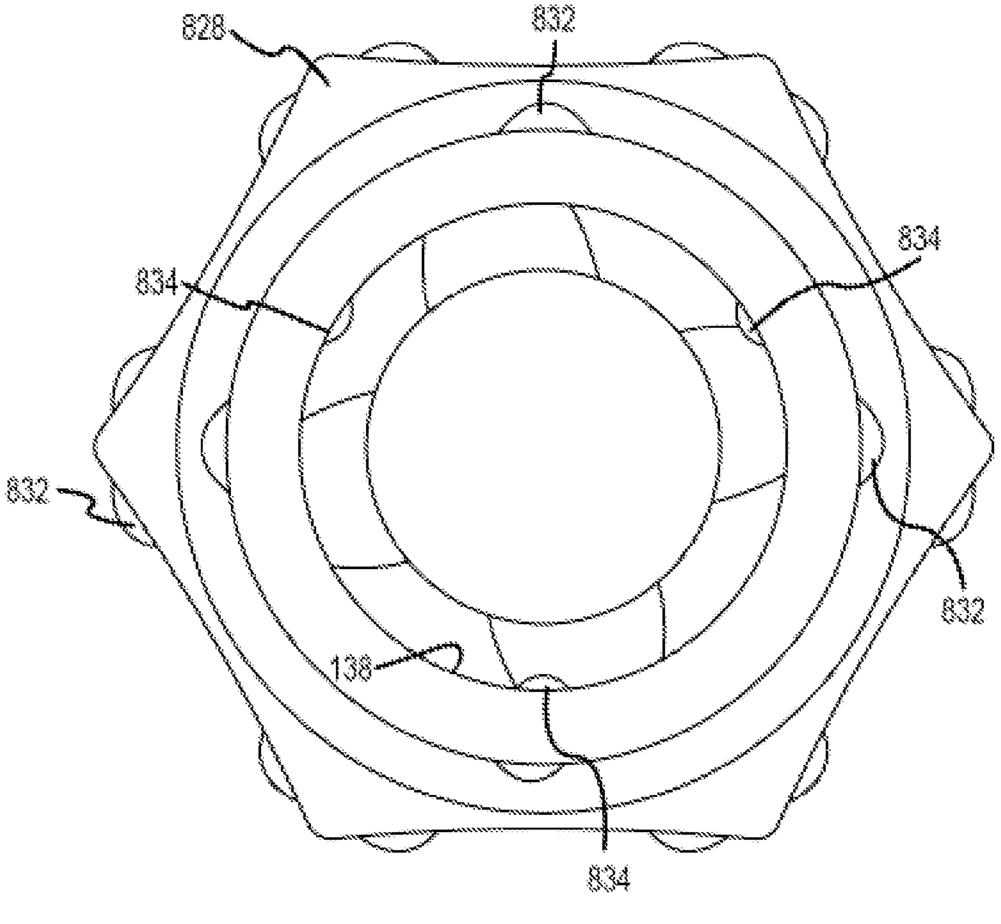
FIG. 38 is a bottom view of the insert of the fifth embodiment of the adjustable length shaft assembly of FIG. 30.

Referring to FIGS. 34 and 38, the outer surface 130 of the insert 828 further includes a plurality of nodal protrusions 832. The nodal protrusions 832 of the insert 828 can be similar to the nodal protrusions 814 of the retainer 812. The nodal protrusions can be point-like protrusions or projections that extend outward from the outer surface 130 of the insert 828. The nodal protrusions 832 are configured to abut or press against the inner surface 122 of the second shaft 120. The nodal protrusions 832 provide a secure fit between the insert 828 and the second shaft 120. Further, the nodal protrusions 832 are configured to abut or press against an inner surface 24 of the first shaft 22. The nodal protrusions 832 of the insert 828 provide better adhesive coverage by allowing the adhesive to collect between the nodal protrusions 832.

The nodal protrusions 832 can include a shape that is substantially spherical. The nodal protrusions 832 of the insert 828 can include a shape similar to the nodal protrusions 814 of the retainer 812. In other embodiments, the nodal protrusions 832 can be any shape capable of abutting or pressing against the inner surface 122 of the second shaft 120. For example, the shape of the nodal protrusions 832 can be a semi-circle, or a shape with at least one curved surface, such as a hemi-sphere, cylinder, triangle, square, rectangle, pentagon, hexagon, polygon, or any other shape.

In the illustrated embodiment, the outer surface 130 of the insert 828 includes 60 nodal protrusions 832, where 24 nodal protrusions 832 abut or press against the inner surface 122 of the second shaft 120, and 36 nodal protrusions 832 abut or press against the inner surface 24 of the first shaft 22. In other embodiments, the insert 828 can include any number of nodal protrusions 832. For example, the insert 828 can include 10-100, 10-90, 10-80, 10-70, or 10-60 nodal protrusions 832. In other examples, the insert 828 can include 10-50, 20-60, 30-70, 40-80, 50-90, or 60-100 nodal protrusions 832. In other examples still, the insert 828 can include 10, 20, 30, 40, 50, 60, 70, 80, 90, or 100 nodal protrusions 832.

Further, the nodal protrusions 832 can comprise a height. The height of the nodal protrusions 832 is measured from the outer surface 130 of the insert 828 to an apex of the nodal protrusion 832 in a direction perpendicular to the outer surface 130 of the insert 828. The nodal protrusion 832 height of the insert 828 and the nodal protrusion 814 height of the retainer 812 can be similar. The height of the nodal protrusions 832 can range from 0.005 to 0.015 inch. In some embodiments, the height of the nodal protrusions 832 can range from 0.005 to 0.01 inch, or 0.01 to 0.015 inch. For example, the height of the nodal protrusions 832 can be 0.005, 0.006, 0.007, 0.008, 0.009, 0.01, 0.011, 0.012, 0.013, 0.014, or 0.015 inch. In one example, the height of the nodal protrusions 832 is 0.01 inch.

Referring to FIG. 38, the insert 828 also includes an inner surface 138. The insert 828 can further include one or more ribs 834 positioned on the inner surface 138 of the insert 828. The one or more ribs 834 can be positioned on the inner surface 138 at the tubular portion 836 of the insert 828. The ribs 834 extend outward from the inner surface 138 of the insert 828. The ribs 834 extend along the tubular portion 836 in a direction from the first axial end face 838 to the second axial end face 840. The ribs 834 provide a secure fit between the threaded screw 140 and the insert 828. In the illustrated embodiment, the insert 828 includes three ribs 834. Each of the ribs 834 are spaced equidistant from one another. In other embodiments, the insert 828 can include any number ribs 834. For example, the insert 828 can include one, two, three, four, five, six, seven, eight, nine, or ten ribs 834. As described in more detail below, the ribs 834 provide a secured fit between the threaded screw 140 and the insert 828. The threaded screw 140 is configured to cut into the ribs 834 to minimize the side to side movement or radial movement between the first shaft 22 and the second shaft 120.

Further, the ribs 834 can comprise a height. The height of the ribs 834 is measured from the inner surface 138 to an apex of the rib 834 in a direction perpendicular to the inner surface 138 of the insert 828. The height of the ribs 834 is measured in a direction radially inward from the inner surface 138 to a centerline extending through the threaded aperture 136 and the tubular portion 836 of the insert 828. The height of the ribs 834 can range from 0.001 to 0.01 inch. In some embodiments, the height of the ribs 834 can range from 0.001 to 0.005 inch, or 0.005 to 0.01 inch. For example, the height of the ribs 834 can be 0.001, 0.002, 0.003, 0.004, 0.005, 0.006, 0.007, 0.008, 0.009, or 0.01 inch. In one example, the height of the ribs 834 is 0.005 inch.

Figure 37:
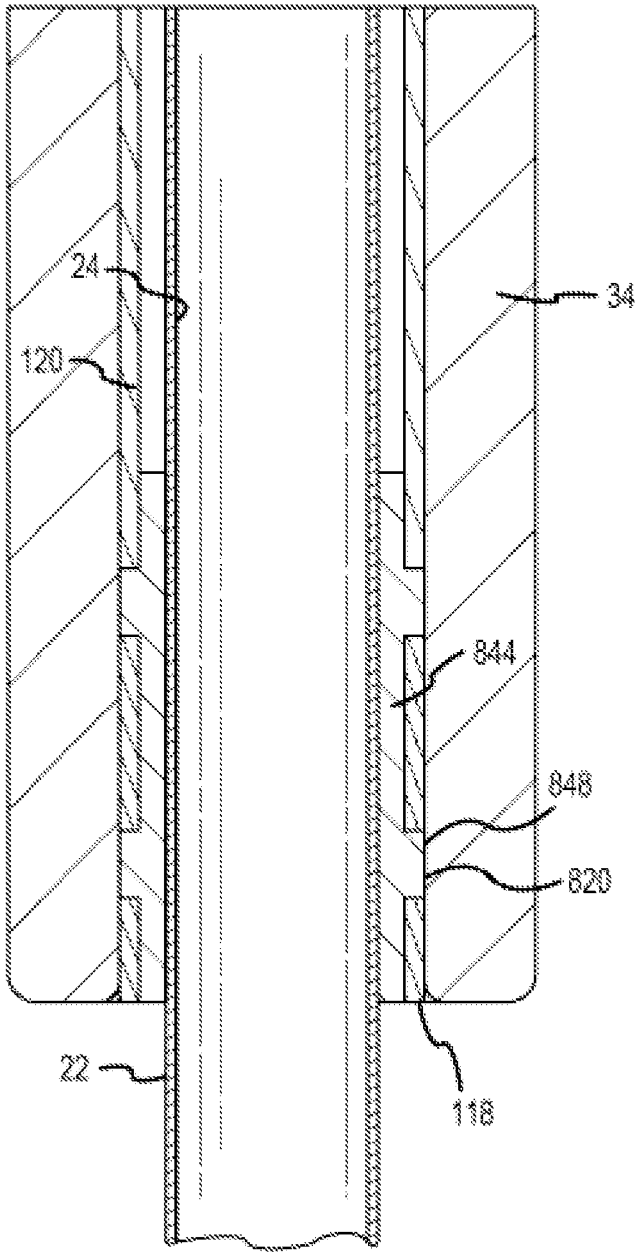
FIG. 37 is a partial cross section view of a portion of the adjustable length shaft assembly of FIG. 30, as shown in a detailed circle in FIG. 35.

Referring to FIGS. 35 and 37, the adjustable shaft length assembly 800 further includes an alignment member 844. The alignment member 844 is positioned at a first end 118 of the second shaft 120. The second end 118 is opposite the second end 116 of the second shaft 120. The alignment member 844 includes one or more protrusions 848. The one or more protrusions 848 extend away from the alignment member and are configured to be received by one or more apertures 820 disposed on the second shaft 120. The protrusions 848 are configured to mechanically interlock with the apertures 820. The protrusions 848 fix the position of the alignment member 844 within the second shaft 120. The alignment member 844 does not move or translate within the second shaft 120 during operation of the adjustable shaft length assembly 800. The alignment member 844 minimizes side to side movement or radial movement of the first shaft 22 within the second shaft 120 during operation of the adjustable shaft length assembly 800. The alignment member 844 minimizes the misalignment of the first shaft within the second shaft 120 thereby allowing the first shaft 22 to freely translate without interfering with the second shaft 120 during operation of the adjustable shaft length assembly 800.

The threaded aperture 136 of the insert 828 receives the threaded screw 140. The threaded screw 140 is configured to have a threaded engagement with the threaded aperture 136. As described above for adjustable shaft length assembly 100, the threaded engagement between the threaded screw 140 and the threaded aperture 136 allows the first shaft 22 and the second shaft 120 to axially move in relation to one another, and temporarily lock the adjustable shaft length assembly in the axial direction when not in use.

In operation of the adjustable length assembly 800, the threads of screw 140 cooperate with the threads of the aperture 136 of the insert 828. As the insert 828 and the first shaft 22 move towards the second end 116, the threaded screw 140 overlaps a portion of the tubular portion 836 of the insert 828. The threads of screw 140 cooperate with the one or more ribs 834 to provide a secure fit between the insert 828 and the threaded screw 140. The threads of screw 140 cut into the one or more ribs 834. The cutting operation between the threaded screw 140 and the ribs 834 is achieved with a diameter of the threaded screw 140 and an opening diameter between the one or more ribs 834.

In the illustrated embodiment, the diameter of the threaded screw 140 is greater than the opening diameter between the one or more ribs 834. In the illustrated embodiment, the diameter of the threaded screw 140 is 0.25 inch, and the opening diameter between the one or more ribs 834 is 0.242 inch. However, the diameters of the threaded screw 140 and the opening between the one or more ribs 834 are not limited and can be any diameter suitable for the threaded screw 140 to cut into the one or more ribs 834. The cutting operation between the threaded screw 140 and the one or more ribs 834 provides a secure fit by minimizing side to side movement or radial movement of the first shaft 22 within the second shaft 120.

The adjustable shaft length assembly 800 described herein can be operated in the same manner as the adjustable shaft length assembly 100 or 500, as described above, wherein restricting rotation motion of the first shaft 22 relative to the second shaft 120 is achieved with the cross sectional shapes of the inner surface 122 of the second shaft 120 and the outer surface 130 of the insert 128 similar to adjust shaft length assembly 500.

Figure 20:
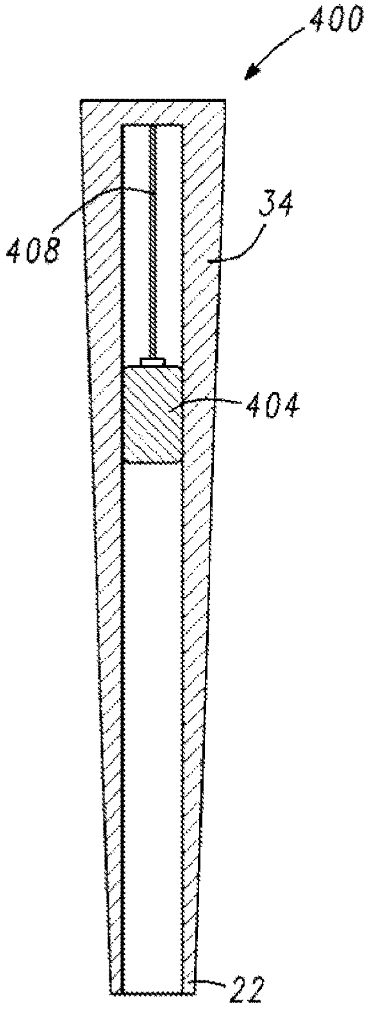
FIG. 20 is a cross section view of a portion of an adjustable mass assembly for use with the golf club of FIG. 1.

FIG. 20 illustrates an embodiment of the adjustable mass assembly 400. In the illustrated embodiment, a grip 34 is attached to a portion of a shaft 22, with the portion of the shaft 22 containing a mass 404. The mass 404 is attached to an adjustment assembly 408 that provides for axial movement of the mass 404 within or along the shaft 22 (or along axis A, shown in FIG. 1), while also locking the mass 404 in a desired position. The adjustment assembly 408 can be any suitable assembly for moving the mass 404 within the shaft 22, as further described below.

The mass 404 is a piece of weighted material, which can include rubber, metal, metal alloy, composite, polyurethane, reinforced polyurethane or any other suitable material or combination of materials. The mass 404 can be any suitable size provided the mass 404 fits and is moveable within the shaft 22. The mass 404 can be any suitable or desired weight, which can include, for example, 1, 2, 3, 4, 5, 6, 7, 8, 9, 10, 11, 12, 13, 14, 15, 16, 17, 18, 19, 20, or more than 20 grams. The mass 404 can be removable from the shaft 22 and replaceable with a second mass 404 having a different weight, size, shape, or combination thereof.

In one or more examples of embodiments, the mass 404 can include a plurality of masses 404 having the same or different weights, sizes, shapes, or combinations thereof. For example, a plurality of masses 404 can be axially arranged or stacked within the shaft 22. As another example, a plurality of masses 404 can be in a radially offset arrangement within the shaft 22. In still other embodiments, the mass 404 can incorporate flexible material(s) that allow for axial movement of the mass 404 in shafts 22 having different or variable shaft diameters, resulting in less influence on shaft stiffness.

In yet another embodiment, the mass 404 can be defined by a plurality of separate shaft sections that together define the shaft 22. One or more sections can be exchangeable or replaceable with a section having a different mass (for example a section having greater mass or less mass). The sections can be coupled together to define the club shaft 22.

Figure 21:
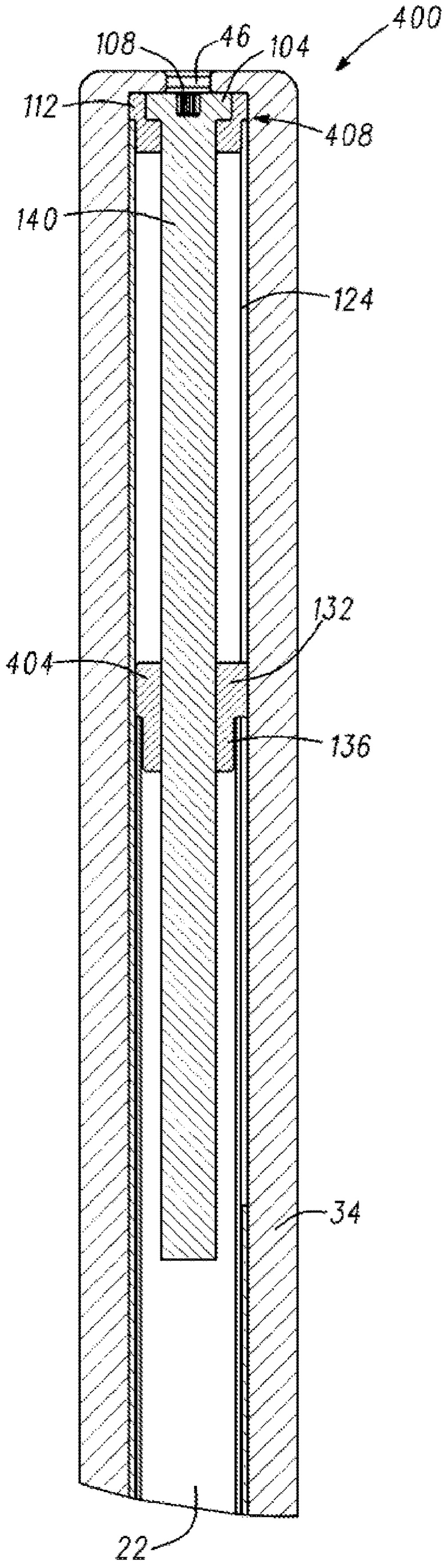
FIG. 21 is a cross section view of a portion of an alternative embodiment of the adjustable mass assembly for use with the golf club of FIG. 1.

Referring now to FIG. 21, an embodiment of an adjustable mass assembly 400 is illustrated. In the embodiment, the adjustment assembly 408 includes components of the adjustable length shaft assembly 100, with the common elements being given the same reference numerals.

The adjustment assembly 408 includes the screw head 104 that is received by the retainer 112 and is static with respect to the shaft 22. The retainer 112 is itself received by the second end or butt end 30 of the shaft 22. The shaft 22 includes a slot or cutout 124 that extends axially along an axis A (shown in FIGS. 1-2) in a direction from the second end 30 towards the club head 14. The slot 124 axially extends along any desired distance or length of the shaft 22.

The mass 404 is received in the shaft 22, and includes a protrusion 132 that projects away from the mass 404 and is keyed to be received by the slot 124. The mass 404 also defines the threaded aperture 136. The threaded aperture 136 receives a corresponding threaded screw 140 that extends away from the screw head 104. The grip 34 is attached to the shaft 22.

In operation of the adjustable mass assembly 400, a user engages a torque wrench with the socket 108 of the screw head 104. To adjust the position of the mass 404 within the shaft 22, the user rotates the torque wrench in a first direction, rotating the screw head 104 and associated screw 140 within the retainer 112. The threads of screw 140 cooperate with the threads of the aperture 136 in the mass 404. The protrusion 132 fixes the rotational position of the mass 404 relative to the shaft 22, such that the rotation of the screw 140 drives the mass 404 axially along the slot 124. As the screw 140 rotates in the first direction, the mass 404 is driven away from the second end 30. Alternatively, the user rotates the torque wrench in a second direction opposite the first direction to move the mass 404 within the shaft 22 towards the second end 30. Once the desired position of the mass 404 within the shaft 22 is attained, the user removes the torque wrench from the screw head 104.

In another embodiment of the adjustable mass assembly 400 (similar to FIG. 21), the slot 124 is replaced with an axial rail on the interior of the shaft 22 to increase axial movement distance of the mass 404 within the shaft 22. Instead of the protrusion 132, a portion of the mass 404 can be keyed to the rail. The rail fixes the rotational position of the mass 404 relative to the shaft 22 and drives the mass 404 axially in response to rotation of the screw 140. The rail can provide greater structural rigidity to the shaft 22 than the slot 124, while also axially extending along a greater length of the shaft 22 to provide a greater mass 404 adjustment distance within the shaft 22.

Figure 29:
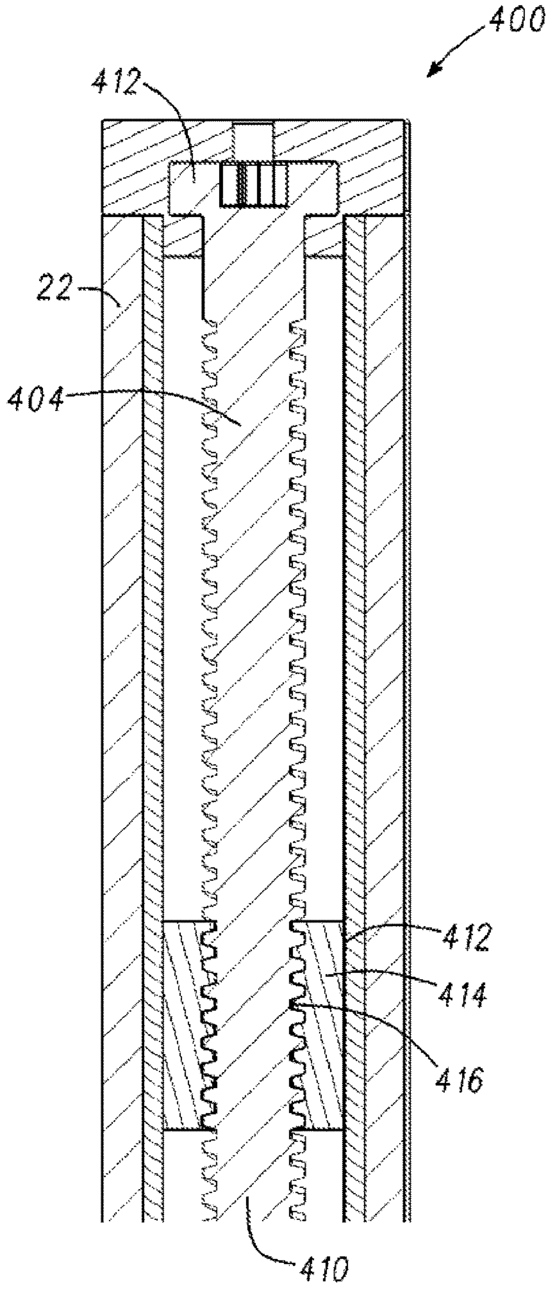
FIG. 29 is a partial cross section view of a portion of a third embodiment of the adjustable length shaft assembly of FIG. 14 with the grip removed.
Figure 30:
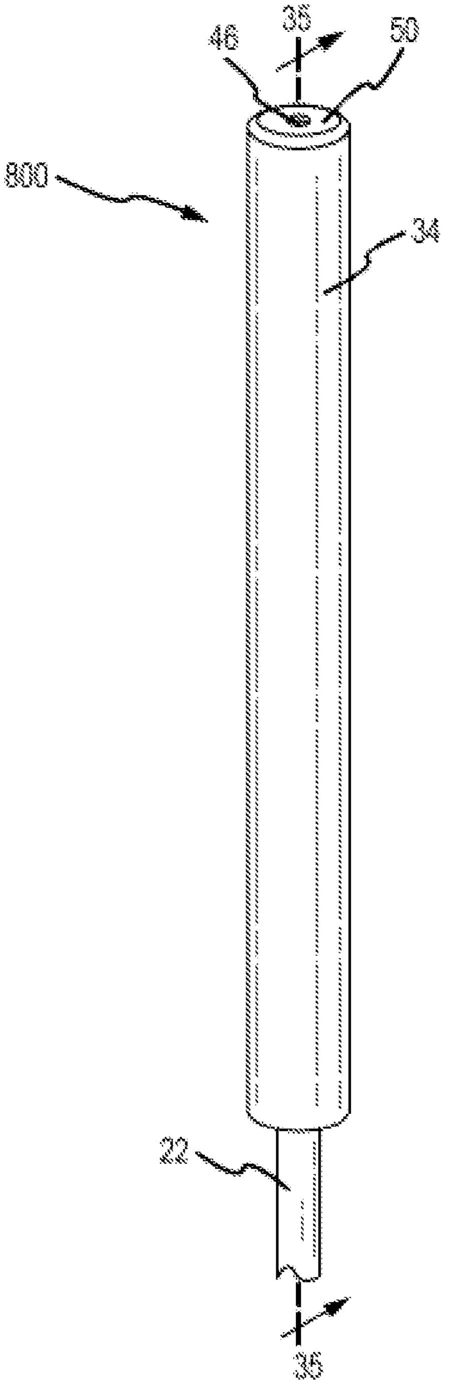
FIG. 30 is a perspective view of a fifth embodiment of the adjustable length shaft assembly for use with the golf club of FIG. 1.
Figure 31:
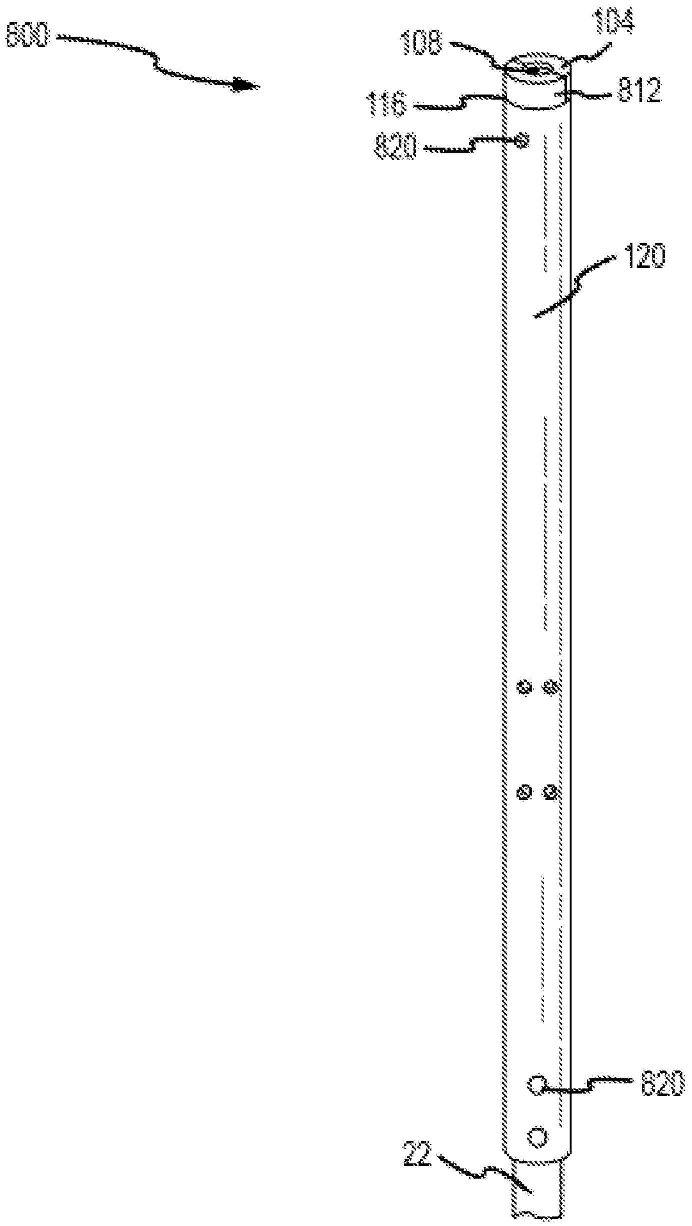
FIG. 31 is a perspective view of the fifth embodiment of the adjustable length shaft assembly of FIG. 30 with the grip removed.

FIG. 29 illustrates another embodiment of a golf club shaft having an adjustable mass assembly 400. In the illustrated embodiment, the adjustable mass assembly 400 includes an adjustable mass 404 depicted as an internal screw located at the butt portion of the shaft 22 or at the grip 34 end. The adjustable mass 404 comprises a threaded body 410 and a screw head 412. The threaded body 410 is received within a screw nut 414.

The screw nut 414 has inner surface threads which threadably engage with the threaded body 410 of the mass 404. The threads of the inner surface 416 of the screw nut 414 guide the mass 404 to move axially relative to the shaft 22 when the mass 404 is rotated. The screw nut 414 further comprises an outer surface 418 which is attached to an inner surface 416 of the shaft 22 at a fixed location along the shaft 22. The screw nut 414 may be attached to the inner surface of the shaft 22 by an adhesive such as epoxy, glue, tape, or etc.

The screw head 412 of the mass 404 comprises a socket 108 exposed at an aperture 46 at the butt portion of the shaft 22. A portion of a torque wrench 150 can be inserted through the aperture 46 and into the socket 108 of the screw head 412 to adjust the position of the mass 404 within the shaft 22.

Rotating the torque wrench 150 in a clockwise motion will shift the mass 404 lower down the shaft 22 or closer to the club head. Similarly, rotating the torque wrench 150 in a counterclockwise motion will shift the mass 404 higher up the shaft 22 or closer to the butt portion. The shifting of the mass 404 affects the moment of inertia, and the swing weight of the golf club 10. The distance and weight of the mass 404 shifts per one full revolution of the torque wrench 150 is dependent on the pitch of the threaded body 410. For example, rotating the torque wrench 150 five revolutions for a mass 404 having a weight of 4 grams will shift the mass 404 1.25 inches while changing the swing weight by 0.1. In another example, rotation the torque wrench 150 two and a half revolutions for a mass 404 having a weight of 8 grams will shift the mass 404 by 1.25 inches will change the swing weight by 0.1.

In one example, the mass 404 has a weight of 4 grams with an added weight of 2 grams located in the club head 14 to be a counter balance in the golf club 10. The counter balance for the adjustable mass 404 in the butt portion of the shaft to the club head 14 is a ratio of about 2:1, for every 2 grams of weight added to the butt portion of the shaft, 1 additional gram must be added to the club head 14. In other embodiments, the adjustable mass 404 in the butt portion of the shaft 22 can have a weight of 6 grams and the club head 14 can have a weight of 3 grams. This counter balance ratio of 2:1 will help maintain the same swing weight of the golf club.

In other embodiments, the adjustment assembly 408 can incorporate components and aspects of the adjustable length shaft assembly 200, 300 to adjust the position and retain the mass 404 within the shaft 22. For example, the mass 404 can be formed of or include an elastic material that can be deformed to retain the mass 404 at a desired position within the shaft 22. As another example, the mass 404 can include a cam portion 368 that rotates within a channel 364 in the shaft, the cam portion 368 rotating between a position where the mass 404 can be axially moved within the shaft 22 and a different position where the cam portion 368 engages one or more cam surfaces 372 to retain the mass 404 at a desired position within the shaft 22. In these examples of embodiments, the distance that the mass 404 can be axially adjusted within the shaft 22 can be limited to less than the entire length of the shaft 22, as the mass 404 can be keyed to the axial slot 134 or positioned at the end of the member 320.

In other embodiments, aspects of the adjustable mass assembly 400 can be incorporated into a golf club 10 in combination with the adjustable length shaft assembly 100, 200, 300 disclosed above. For example, each adjustable length shaft assembly 100, 200, 300 can have a nested screw assembly to separately adjust shaft length and mass 404 position within the shaft.

As an example, the screw head 104 and screw 140 of the adjustable length shaft assembly 100 can receive a second screw (not shown) that is nested within. Rotation of the screw 140 adjusts the club length, while rotation of only the second screw adjusts the position of the mass 404 within the club shaft. Generally, the screw head 104 is received in the well 224, and a biasing member applies a biasing force on the screw head 104 in a direction 256, 376 away from the retainer 112. When biased, the screw 140 and the second screw can rotate together to adjust the club length. To adjust the position of the mass 404 within the club shaft, the user can apply a downward force in the direction 260, 380 (see FIGS. 11 and 16) to overcome the biasing force and engage the screw head 104 with a portion of the well 224. The portion of the well 224 can include a finger or aperture that interlocks with an associated aperture or finger provided on the screw head 104. The interlocking fingers/apertures prevent rotation of the screw head 104 and associated screw 140, while allowing for rotation of the second screw. Accordingly, by application of downward and rotational force, the second screw rotates to axially adjust the position of the mass 404 within the club shaft. In other embodiments, the nested second screw can be incorporated into the adjustment members 208, 308 of the respective adjustable length shaft assembly 200, 300.

In embodiments of the golf club 10 that include the adjustable mass 404 of the adjustable mass assembly 400, the golf club 10 can include one or more removable or adjustable weights provided in the club head 14. The adjustable mass 404 and adjustable weights in the club head 14 can together adjust attributes of the golf club 10, such as moment of inertia, total weight, and swing weight.

In other embodiments of the golf club 10 that includes the adjustable mass 404, the mass 404 can be moved within the club shaft 22 (and/or 120) to adjust swing weight while maintaining total weight. For example, by moving the adjustable mass 404 closer to the grip end 50, the swing weight can decrease while maintaining the same total weight. By moving the adjustable mass 404 closer to the club head 14, the swing weight can increase while maintaining the same total weight.

In one or more other examples of embodiments of the golf club 10 that includes the adjustable mass 404 of the adjustable mass assembly 400, the adjustable mass 404 can be moved within the club shaft 22 (and/or 120) to adjust moment of inertia while maintaining total weight. Generally, by moving the adjustable mass 404 closer to the club head 14, the moment of inertia can increase while maintaining the same total weight. By moving the adjustable mass 404 within the club shaft 22 (and/or 120), the moment of inertia can be adjusted or customized to a golfer's profile (e.g., swing style (upright, flat, etc.), strength, height, arm length, swing speed, swing tempo) in order to achieve a desired shot shape or dispersion pattern without substantially impacting total weight.

It should be appreciated that the adjustable mass 404 can be used to adjust mass distribution relative to a center of rotation of an individual golfer's golf swing. By adjusting the mass 404 closer to or further away from the center of rotation of a given golf swing, club delivery to a golf ball can be improved. For example, adjusting the mass 404 can improve consistency of an angle of attack, swing path, or swing direction towards the golf ball. This in turn can result in more consistent contact between the club head 14 and the golf ball.

In addition, it should be appreciated that the adjustable mass 404 can be used to adjust launch angle and/or ball flight of a golf ball after contact with the golf club 10. A golfer can desire to change launch angle or golf ball trajectory based on changes to swing mechanics, weather conditions, and/or course conditions. For example, the adjustable mass 404 can be moved within the club shaft to a first position to lower a launch angle or lower a golf ball trajectory in windy weather conditions and reduce the effect of wind on the golf ball after contact. As another example, the adjustable mass 404 can be used to lower a launch angle or lower a golf ball trajectory on a links style golf course or similar course conditions where the golfer benefits from the golf ball rolling at the end of the ball flight. Similarly, the adjustable mass 404 can be moved within the club shaft to a second position to raise a launch angle or increase a golf ball trajectory.

In other embodiments, the mass 404 can be used to locally change or increase shaft stiffness along a portion, up to the entirety, of the shaft 22 (and/or shaft 120). Shaft stiffness is measured with equipment that oscillates the shaft and measures a frequency in cycles per minute (CPM). Shafts that do not bend very easily are considered to have a stiff flex and have a high frequency, while shafts that do bend easily are considered to have a softer flex and have a lower frequency. By adjusting the position of the mass 404 within the shaft 22, 120 closer to the club head 14, the measured CPM is reduced, resulting in a softer or reduced shaft stiffness. Conversely, adjusting the position of the mass 404 within the shaft 22, 120 further away from the club head 14 increases the measured CPM, resulting in a firmer or increased shaft stiffness. A golfer can desire to change shaft stiffness based on optimizing shaft performance in view of the golfer's profile (e.g., swing style (upright, flat, etc.), strength, height, arm length, swing speed, swing tempo), changes to swing mechanics, weather conditions, and/or course conditions.

It should be appreciated that the adjustable mass 404 can be used with one or more other adjustable aspects of a golf club 10 in addition to the adjustable length shaft disclosed herein. For example, the adjustable mass 404 can be used with an adjustable club loft, an adjustable club lie, an adjustable face angle at address (e.g., open, square, closed), and/or adjustable weights on a club head 14 to improve customization to the golfer's profile (e.g., swing style (upright, flat, etc.), strength, height, arm length, swing speed, swing tempo).

Figure 22:
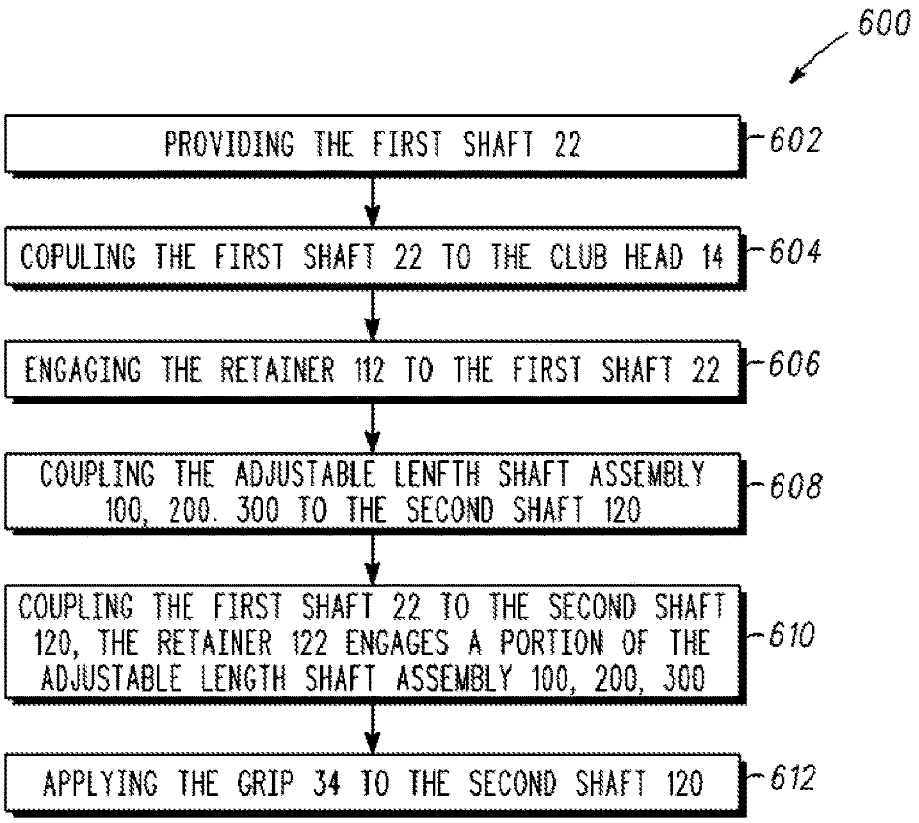
FIG. 22 is a flow chart of a method of manufacturing the adjustable length shaft assembly.

FIG. 22 illustrates a method 600 of manufacturing the golf club 10 having the adjustable length shaft assembly 100, 200, 300, 500. The method 600 includes the steps of providing the first shaft 22 (step 602), coupling the first shaft 22 to the club head 14 (step 604), engaging the retainer 112 to the first shaft 22 (step 606), coupling the adjustable length shaft assembly 100, 200, 300, 500 to the second shaft 120 (step 608), coupling the first shaft 22 to the second shaft 120, wherein the retainer 112 engages a portion of the adjustable length shaft assembly 100, 200, 300, 500 (step 610), and applying the grip 34 to the second shaft 120 (step 612).

Figure 23:
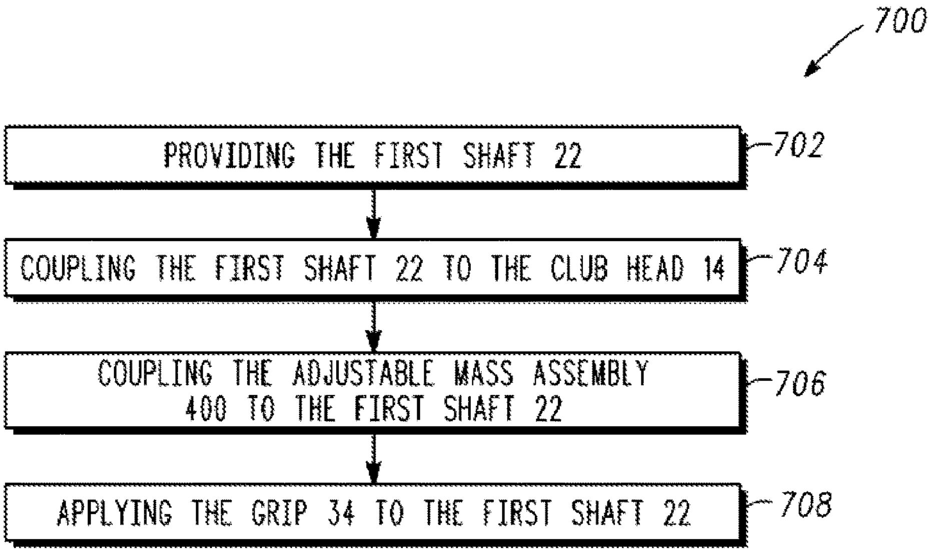
FIG. 23 is a flow chart of a method of manufacturing the adjustable mass assembly.

FIG. 23 illustrates a method 700 of manufacturing the golf club 10 having the adjustable mass assembly 400. The method 700 includes providing the first shaft 22 (step 702), coupling the first shaft 22 to the club head 14 (step 704), coupling the adjustable mass assembly 400 to the first shaft 22 (step 706), and applying the grip 34 to the first shaft 22 (step 708).

The method of manufacturing the golf club 10 described herein is merely exemplary and is not limited to the embodiments presented herein. The method can be employed in many different embodiments or examples not specifically depicted or described herein. In some embodiments, the processes of the method described can be performed in any suitable order. In other embodiments, one or more of the processes can be combined, separated, or skipped.

The adjustable length shaft assembly 100, 200, 300, 500 has certain advantages over the known art. For example, the adjustable length shaft assembly 100, 200, 300, 500 is not visible from an exterior of the golf club. The grip 34 is attached and substantially overlaps the second shaft 120, while a portion of the first shaft 22 is received by the second shaft 120. Since the adjustable length shaft assembly 100, 200, 300, 500 and the second shaft 120 are not generally visible from the exterior of the golf club 10, the golf club 10 is more visually appealing and looks more like a traditional golf club 10. In addition, the adjustable length shaft assembly 100, 200, 300, 500 is lighter in weight, reducing the effect the assembly has on both swing weight and total weight of the golf club 10. Further, the adjustable length shaft assembly 100, 200, 300, 500 allows for adjustment of the club length while maintaining the orientation of the grip 34 (i.e., it does not change the rotational position of the grip 34). The adjustable length shaft assembly 100, 200, 300 also allows for adjustment of the club length with a single tool, such as a torque wrench. The single tool can also be used to adjust other aspects of the golf club, such as weights on the club head 14, club loft, club lie, club face angle, and/or to replace the shaft 22. In addition, the adjustable length shaft assembly 100, 200, 300, 500 allows the shaft length of the golf club 10 to be customized to a golfer's profile, such as a golfer's height, arm length, and/or natural address position.

The adjustable length shaft assembly 800 has advantages similar to the advantages of the adjustable length shaft assembly 100, 200, 300, and 500 described above, and further advantages over the known art. For example, the adjustable length shaft assembly 800 reduces the side to side movement or radial movement between the first shaft 22 and the second shaft 120 by at least 70%. The nodal protrusions of the insert 828 and the retainer 812 improves the concentricity of the first shaft 22 within the second shaft 120. Further, the cutting operation between the threaded screw 140 and the ribs 834 of the insert 828 provides a secured fit between the threaded screw 140 and the insert 828 thereby reducing side to side or radial movement between the first shaft 22 and the second shaft 120. The alignment member 844 also provides an additional means of improving the concentricity of the first shaft 22 within the second shaft 120 to minimize misalignment and allow the first shaft 22 to freely translate within the second shaft 120 during operation of the adjustable length shaft assembly 800.

The adjustable mass assembly 400 has certain advantages over the known art. For example, by adjusting the mass 404 within the club shaft 22 (and/or shaft 120), the swing weight of the club can be adjusted while maintaining total weight, the moment of inertia can be adjusted while maintaining total weight, and/or the shaft stiffness can be adjusted. In addition, the golf ball trajectory can be adjusted after contact can be adjusted, which can be desirable for different course conditions, weather conditions, or mechanical changes to a golfer's swing. Further, adjusting the mass 404 within the club shaft 22 (and/or shaft 120) adjusts the mass distribution of the golf club 10 relative to a center of rotation of a golfer's golf swing, improving consistency of the angle of attack, swing path, and/or swing direction towards the golf ball, resulting in more consistent contact between the club head 14 and the golf ball.

It should be appreciated that the advantages are provided for purposes of an example, and are not inclusive or limiting.

Replacement of one or more claimed elements constitutes reconstruction and not repair. Additionally, benefits, other advantages, and solutions to problems have been described with regard to specific embodiments. The benefits, advantages, solutions to problems, and any element or elements that can cause any benefit, advantage, or solution to occur or become more pronounced, however, are not to be construed as critical, required, or essential features or elements of any or all of the claims, unless such benefits, advantages, solutions, or elements are expressly stated in such claims.

As the rules to golf can change from time to time (e.g., new regulations can be adopted or old rules can be eliminated or modified by golf standard organizations and/or governing bodies such as the United States Golf Association (USGA), the Royal and Ancient Golf Club of St. Andrews (R&A), etc.), golf equipment related to the apparatus, methods, and articles of manufacture described herein can be conforming or non-conforming to the rules of golf at any particular time. Accordingly, golf equipment related to the apparatus, methods, and articles of manufacture described herein can be advertised, offered for sale, and/or sold as conforming or non-conforming golf equipment. The apparatus, methods, and articles of manufacture described herein are not limited in this regard.

The above examples can be described in connection with a wood-type golf club, a fairway wood-type golf club, a hybrid-type golf club, an iron-type golf club, a wedge-type golf club, or a putter-type golf club. Alternatively, the apparatus, methods, and articles of manufacture described herein can be applicable to other type of sports equipment such as a hockey stick, a tennis racket, a fishing pole, a ski pole, etc.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

Clause 1. A golf club comprising: a first shaft coupled to a club head; a second shaft configured to slidably engage a portion of the first shaft; a grip coupled to the second shaft; and an adjustable length shaft assembly at least partially positioned within the second shaft and configured to permit a portion of the first shaft to slide in relation to the second shaft, the adjustable length shaft assembly comprising: an insert coupled to an axial end face of the first shaft, the insert comprising a threaded aperture; and an adjustment member comprising a threaded screw configured to threadably engage with the threaded aperture of the insert, the adjustment member configured to rotate and the insert configured to travel along the adjustment member as the adjustment member rotates to allow the first shaft to slide in relation to the second shaft to adjust the length of the golf club; wherein the grip is restricted from rotation about the first shaft or the second shaft as the first shaft slides in relation to the second shaft.

Clause 2. The golf club of clause 1, wherein the adjustable length shaft assembly includes a socket configured to receive a tool.

Clause 3. The golf club of clause 1, wherein an inner surface of the second shaft and an outer surface of the insert comprise a shape capable of restricting rotational motion between the second shaft and the insert.

Clause 4. The golf club of clause 3, wherein the inner surface of the second shaft and the outer surface of the insert comprise a hexagonal cross sectional shape.

Clause 5. The golf club of clause 1, wherein an outer surface of the insert comprises a plurality of nodal protrusions.

Clause 6. The golf club of clause 1, wherein an inner surface of the insert comprises one or more ribs that engage the adjustment member.

Clause 7. The golf club of clause 6, wherein a diameter of the threaded screw is greater than an opening diameter between the one or more ribs.

Clause 8. The golf club of clause 1, wherein the adjustment member is received by a retainer configured to be static with respect to the second shaft and allow the rotation of the adjustment member.

Clause 9. The golf club of clause 8, wherein the retainer comprises one or more pegs that are configured to be received by one or more apertures disposed on the second shaft.

Clause 10. The golf club of clause 1, wherein first shaft is received by an alignment member positioned near a first end of the second shaft and configured improve the concentricity of the first shaft within the second shaft.

Clause 11. A golf club comprising: a first shaft coupled to a club head; a second shaft configured to slidably engage a portion of the first shaft; a grip coupled to the second shaft; and an adjustable length shaft assembly at least partially positioned within the second shaft and configured to permit a portion of the first shaft to slide in relation to the second shaft, the adjustable length shaft assembly comprising: an insert coupled to an axial end face of the first shaft, the insert comprising a threaded aperture; an adjustment member comprising a threaded screw configured to threadably engage with the threaded aperture of the insert, the adjustment member configured to rotate and the insert configured to travel along the adjustment member as the adjustment member rotates to allow the first shaft to slide in relation to the second shaft to adjust the length of the golf club; and a retainer coupled to a butt end of the second shaft and configured to receive the adjustment member, the retainer configured to be static with respect to the second shaft and allow for the rotation of the adjustment member; wherein the insert is positioned away from the retainer in an expended configuration, and insert abuts the retainer in a fully contracted configuration; wherein the grip is restricted from rotation about the first shaft or the second shaft as the first shaft slides in relation to the second shaft.

Clause 12. The golf club of clause 11, wherein the adjustable length shaft assembly includes a socket configured to receive a tool.

Clause 13. The golf club of clause 11, wherein an inner surface of the second shaft and an outer surface of the insert comprise a shape capable of restricting rotational motion between the second shaft and the insert.

Clause 14. The golf club of clause 13, wherein the inner surface of the second shaft and the outer surface of the insert comprise a hexagonal cross sectional shape.

Clause 15. The golf club of clause 11, wherein an outer surface of the insert comprises a plurality of nodal protrusions.

Clause 16. The golf club of clause 11, wherein an outer surface of the retainer comprises a plurality of nodal protrusions.

Clause 17. The golf club of clause 11, wherein an inner surface of the insert comprises one or more ribs that engage the adjustment member.

Clause 18. The golf club of clause 17, wherein a diameter of the adjustment member is greater than an opening diameter between the one or more ribs.

Clause 19. The golf club of clause 11, wherein first shaft is received by an alignment member positioned near a first end of the second shaft and configured improve the concentricity of the first shaft within the second shaft.

Clause 20. The golf club head of clause 19, wherein the alignment member comprises one or more pegs that are configured to be received by one or more apertures disposed on the second shaft.

Clause 21. The golf club of clause 11, wherein the insert engages a portion of the first shaft to define an engagement length; wherein the engagement length is 5.0 inch.

Clause 22. The golf club of clause 11, wherein an outer surface of the retainer comprises a plurality of nodal protrusions.

Clause 23. The golf club of clause 11, wherein the outer surface of the retainer comprises a hexagonal cross sectional shape.

Clause 24. The golf club of clause 11, wherein the second shaft is formed from nylon 66 with a 30% carbon fiber filler material.

Clause 25. The golf club of clause 11, wherein the insert and the first shaft move together as the adjustment member rotates.

Clause 26. The golf club of clause 15, wherein the nodal protrusions of the insert abut an inner surface of the second shaft.

Clause 27. The golf club of clause 22, wherein the nodal protrusions of the retainer abut an inner surface of the second shaft.

Clause 28. The golf club of clause 17, wherein the threaded screw comprises a diameter; wherein the one or more ribs define an opening diameter; wherein the threaded screw diameter is greater than the opening diameter between the one or more ribs.

Clause 29. The golf club of clause 28, wherein the threaded screw diameter is 0.25 inch and the opening diameter between the one or more ribs is 0.242 inch.

Clause 30. The golf club of clause 11, wherein the insert is permanently coupled to the axial end face of the first shaft.

Clause 31. The golf club of clause 30, wherein the insert is coupled to the axial end face of the first shaft with an adhesive.

Various features and advantages of the disclosure are set forth in the following claims.

The invention claimed is:

1. A golf club comprising:

a first shaft having a first end and a second end, wherein the first end of the first shaft is coupled to a club head;

a second shaft configured to slidably engage a portion of the first shaft, the second shaft comprising a butt end;

a grip coupled to the second shaft; and an adjustable length shaft assembly at least partially positioned within the second shaft and configured to permit a portion of the first shaft to slide in relation to the second shaft, the adjustable length shaft assembly comprising:

a compression assembly further comprising an adjustment member and a retainer;

wherein the adjustment member comprises an adjustment member head portion connected to a shaft portion;

wherein the shaft portion extends away from the adjustment member head portion in the second shaft;

wherein the adjustment member head portion has a head portion diameter greater than a shaft portion diameter;

wherein the retainer comprises a well defining a recess connected to a tubular portion;

wherein the tubular portion extends away from the well into the second shaft;

wherein the tubular portion defines an open end at an end of the tubular portion opposite the well;

wherein the retainer is received by the second shaft through a second end;

wherein the well is attached to the second shaft at the second end;

wherein the retainer does not rotate or move independently of the second shaft, but travels with the second shaft;

wherein the well has a well diameter greater than a tubular portion diameter;

wherein the retainer slidably receives the adjustment member head portion;

wherein the tubular portion slidably receives the shaft portion;

wherein the shaft portion extends through the tubular portion and out the open end;

wherein the tubular portion diameter is complementary to an adjustment member head portion outer diameter allowing the adjustment member to slide in an axial direction parallel to the first and second shafts;

wherein the adjustment member resiliently connected to the retainer by a biasing member connected to the adjustment member head portion;

wherein the biasing member is received in the well.

2. The golf club of claim 1, wherein the compression assembly further comprises an elastic member;

wherein the elastic member provides a selective expansive force between the first shaft and the tubular portion such that the selective expansive force restricts movement between the first shaft and the second shaft.

3. The golf club of claim 2, wherein the elastic member is retained by the compression assembly between the adjustment member and the retainer.

4. The golf club of claim 2, wherein the elastic member has a generally cylindrical shape.

5. The golf club of claim 2, wherein the elastic member further comprises a central channel configured to receive a portion of the retainer that carries a portion of the adjustment member; and wherein a portion of the adjustment member extends entirely through the elastic member.

6. The golf club of claim 5, wherein the retainer further comprises a first compression member retainer and the adjustment member further comprises a second compression member retainer.

7. The golf club of claim 6, wherein the first compression member retainer further comprises a plurality of fins that project away from the tubular portion.

8. The golf club of claim 6, wherein the first compression member retainer further comprises an annular, ring-like member that projects away from the tubular portion.

9. The golf club of claim 6, wherein the first compression member retainer is integrally formed with the retainer.

10. The golf club of claim 6, wherein the first compression member retainer is attached to the retainer.

11. The golf club of claim 6, wherein the first compression member retainer comprises a first compression member retainer diameter, which is larger that a tubular portion diameter; and wherein the first compression member retainer diameter is smaller than a first shaft inner diameter.

12. The golf club of claim 6, wherein the second compression member retainer is an annular, ring-like member that projects away from the shaft portion.

13. The golf club of claim 6, wherein the second compression member retainer is configured to receive the shaft portion forming a threaded connection.

14. The golf club of claim 6, wherein the second compression member retainer is integrally formed with the shaft portion.

15. The golf club of claim 6, wherein the second compression member retainer comprises a second compression member diameter that is smaller than a first shaft inner diameter.

16. The golf club of claim 6, wherein the biasing member applies tension between the adjustment member and the retainer as the adjustment member is held in place in relation to the retainer by the second compression member retainer.

17. The golf club of claim 16, wherein as the biasing member applies a biasing force, the second compression member retainer contacts the retainer and the elastic member to counteract the biasing force and create tension.

18. The golf club of claim 2, wherein the compression assembly is adjustable between a first configuration and a second configuration;

wherein, in the first configuration, the compression assembly applies a selective compressive force to the elastic member; and wherein, in the second configuration, the compression assembly does not apply a selective compressive force to the elastic member.

19. The golf club of claim 6, wherein the biasing member applies a biasing force against the adjustment member head portion in a first direction away from the club head; and wherein the biasing force draws the second compression member retainer towards the first compression member retainer, decreasing a distance between the first compression member retainer and the second compression member retainer.

20. The golf club of claim 19, wherein the second compression member retainer applies a compressive force to the elastic member expanding the elastic member radially outward from the compression assembly to engage the first shaft, which restricts the movement of the retainer in relation to the first shaft in an axial direction.

* * * * *